US011700050B2

(12) United States Patent
Ma et al.

(10) Patent No.: US 11,700,050 B2
(45) Date of Patent: Jul. 11, 2023

(54) POLARIZATION INDICATION SIGNALING

(71) Applicant: QUALCOMM Incorporated, San Diego, CA (US)

(72) Inventors: Liangping Ma, San Diego, CA (US); Xiao Feng Wang, San Diego, CA (US); Ayan Sengupta, San Diego, CA (US); Alberto Rico Alvarino, San Diego, CA (US); Peter Gaal, San Diego, CA (US); Bharat Shrestha, San Diego, CA (US); Jun Ma, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/447,146

(22) Filed: Sep. 8, 2021

(65) Prior Publication Data
US 2022/0109491 A1 Apr. 7, 2022

Related U.S. Application Data

(60) Provisional application No. 63/198,217, filed on Oct. 2, 2020.

(51) Int. Cl.
*H04J 13/00* (2011.01)
*H04B 7/10* (2017.01)
(Continued)

(52) U.S. Cl.
CPC ............. *H04B 7/10* (2013.01); *H04L 5/0098* (2013.01); *H04W 72/046* (2013.01); *H04W 72/0453* (2013.01); *H04J 13/004* (2013.01)

(58) Field of Classification Search
CPC ...... H04B 7/0639; H04B 7/10; H04B 7/0413; H04B 7/0695; H04B 7/063; H04B 7/0478;
(Continued)

(56) References Cited

U.S. PATENT DOCUMENTS

2013/0331039 A1* 12/2013 Hillstrom ................. H04B 7/10
455/39
2017/0202014 A1 7/2017 Moon et al.
(Continued)

FOREIGN PATENT DOCUMENTS

WO WO-2021058576 A1 * 4/2021
WO WO-2022053740 A1 * 3/2022

OTHER PUBLICATIONS

Mediatek Inc: "Summary#4 of 8.4.4 Other Aspects of NR-NTN", 3GPP Draft, R1-2007233, 3GPP TSG RAN WG1 Meeting #102e, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 26, 2020 (Aug. 26, 2020), XP051922054, 47 Pages, Retrieved from the Internet: URL: https://ftp.3gpp.org/tsg_ran/WG1_RL1/TSGR1_102-e/Docs/R1-2007233.zip [retrieved on Aug. 26, 2020] Section 4.1, Section 4.2.1, Section 4.3.1.
(Continued)

*Primary Examiner* — Eva Y Puente
(74) *Attorney, Agent, or Firm* — Harrity & Harrity, LLP

(57) ABSTRACT

Various aspects of the present disclosure generally relate to wireless communication. In some aspects, a base station may determine a polarization of a bandwidth part. The base station may transmit, to a user equipment, a polarization indication that indicates the polarization for the bandwidth part. Numerous other aspects are provided.

30 Claims, 16 Drawing Sheets

(51) Int. Cl.
  *H04L 5/00* (2006.01)
  *H04W 72/044* (2023.01)
  *H04W 72/0453* (2023.01)

(58) Field of Classification Search
  CPC ... H04B 7/0469; H04B 7/0617; H04W 88/08; H04W 72/046; H04W 16/10; H04W 88/02; H04W 16/28; H04W 72/04; H04W 36/00; H04W 72/0406; H04L 5/0048; H04L 5/0051; H04L 5/00; H04L 5/005; H04L 5/0053; H04L 5/0096; H04L 5/0098; H04L 5/001; H04L 5/0041; H04J 13/004; H04J 11/0069
  USPC .......................................................... 375/262
  See application file for complete search history.

(56) References Cited

U.S. PATENT DOCUMENTS

2019/0326974 A1* 10/2019 Li .................... H04B 7/0469
2021/0036893 A1*  2/2021 Visotsky ............ H04L 25/0202
2022/0109543 A1*  4/2022 Ma ..................... H04L 5/0048
2022/0217589 A1*  7/2022 Wang ................. H04B 7/18513

OTHER PUBLICATIONS

Panasonic: "Discussion on Beam Management and Polarization for NTN", 3GPP TSG RAN WG1 #99, R1-1912902, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18-22, 2019, Nov. 8, 2019 (Aug. 11, 2019), 3 Pages, XP051820237, Retrieved from the Internet: URL: https://ftp.3gpp.org/tsg_ran/WG1_RL1/TSGR1_99/Docs/R1-1912902. zip, R1-1912902 NTN BM and Polarization.docx [Retrieved on Nov. 8, 2019], Section 2 and Section 3, The whole document.
Partial International Search Report—PCT/US2021/071410—ISA/EPO—dated Jan. 7, 2022.
International Search Report and Written Opinion—PCT/US2021/071410—ISA/EPO—dated Feb. 28, 2022.

* cited by examiner

POLARIZATION INDICATION SIGNALING

CROSS-REFERENCE TO RELATED APPLICATION

This patent application claims priority to U.S. Provisional Patent Application No. 63/198,217, filed on Oct. 2, 2020, entitled "POLARIZATION INDICATION SIGNALING," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for polarization indication signaling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a base station includes determining a polarization of a bandwidth part; and transmitting, to a user equipment, a polarization indication that indicates the polarization for the bandwidth part.

In some aspects, a method of wireless communication performed by a base station includes determining a polarization of a transmission; and transmitting, to a user equipment, a configuration that indicates the polarization of the transmission.

In some aspects, a method of wireless communication performed by a base station includes determining a polarization relationship between a source transmission and a target transmission with respect to the base station and a user equipment; and transmitting, to the user equipment, a quasi co-location instance indicating the polarization relationship between the source transmission and the target transmission.

In some aspects, a method of wireless communication performed by a user equipment includes receiving, from a base station, a polarization indication that indicates a polarization for a bandwidth part; and performing a communication with the base station based at least in part on the polarization for the bandwidth part.

In some aspects, a method of wireless communication performed by a user equipment includes receiving, from a base station, a configuration that indicates a polarization of a transmission; and processing the transmission based at least in part on the polarization of the transmission.

In some aspects, a method of wireless communication performed by a user equipment includes receiving, from a base station, a quasi co-location instance indicating a polarization relationship between a source transmission and a target transmission; and performing a communication with the base station based at least in part on the polarization relationship.

In some aspects, a base station for wireless communication includes a memory and one or more processors, coupled to the memory, configured to: determine a polarization of a bandwidth part; and transmit, to a user equipment, a polarization indication that indicates the polarization for the bandwidth part.

In some aspects, a base station for wireless communication includes a memory and one or more processors, coupled to the memory, configured to: determine a polarization of a transmission; and transmit, to a user equipment, a configuration that indicates the polarization of the transmission.

In some aspects, a base station for wireless communication includes a memory and one or more processors, coupled to the memory, configured to: determine a polarization relationship between a source transmission and a target transmission with respect to the base station and a user equipment; and transmit, to the user equipment, a quasi co-location instance indicating the polarization relationship between the source transmission and the target transmission.

In some aspects, a user equipment for wireless communication includes a memory and one or more processors, coupled to the memory, configured to: receive, from a base station, a polarization indication that indicates a polarization for a bandwidth part; and perform a communication with the base station based at least in part on the polarization for the bandwidth part.

In some aspects, a user equipment for wireless communication includes a memory and one or more processors, coupled to the memory, configured to: receive, from a base station, a configuration that indicates a polarization of a transmission; and process the transmission based at least in part on the polarization of the transmission.

In some aspects, a user equipment for wireless communication includes a memory and one or more processors, coupled to the memory, configured to: receive, from a base station, a quasi co-location instance indicating a polarization relationship between a source transmission and a target transmission; and perform a communication with the base station based at least in part on the polarization relationship.

In some aspects, a non-transitory computer-readable medium storing a set of instructions for wireless communication includes one or more instructions that, when executed by one or more processors of a base station, cause the base station to: determine a polarization of a bandwidth part; and transmit, to a user equipment, a polarization indication that indicates the polarization for the bandwidth part.

In some aspects, a non-transitory computer-readable medium storing a set of instructions for wireless communication includes one or more instructions that, when executed by one or more processors of a base station, cause the base station to: determine a polarization of a transmission; and transmit, to a user equipment, a configuration that indicates the polarization of the transmission.

In some aspects, a non-transitory computer-readable medium storing a set of instructions for wireless communication includes one or more instructions that, when executed by one or more processors of a base station, cause the base station to: determine a polarization relationship between a source transmission and a target transmission with respect to the base station and a user equipment; and transmit, to the user equipment, a quasi co-location instance indicating the polarization relationship between the source transmission and the target transmission.

In some aspects, a non-transitory computer-readable medium storing a set of instructions for wireless communication includes one or more instructions that, when executed by one or more processors of a user equipment, cause the user equipment to: receive, from a base station, a polarization indication that indicates a polarization for a bandwidth part; and perform a communication with the base station based at least in part on the polarization for the bandwidth part.

In some aspects, a non-transitory computer-readable medium storing a set of instructions for wireless communication includes one or more instructions that, when executed by one or more processors of a user equipment, cause the user equipment to: receive, from a base station, a configuration that indicates a polarization of a transmission; and process the transmission based at least in part on the polarization of the transmission.

In some aspects, a non-transitory computer-readable medium storing a set of instructions for wireless communication includes one or more instructions that, when executed by one or more processors of a user equipment, cause the user equipment to: receive, from a base station, a quasi co-location instance indicating a polarization relationship between a source transmission and a target transmission; and perform a communication with the base station based at least in part on the polarization relationship.

In some aspects, an apparatus for wireless communication includes means for determining a polarization of a bandwidth part; and means for transmitting, to a user equipment, a polarization indication that indicates the polarization for the bandwidth part.

In some aspects, an apparatus for wireless communication includes means for determining a polarization of a transmission; and means for transmitting, to a user equipment, a configuration that indicates the polarization of the transmission.

In some aspects, an apparatus for wireless communication includes means for determining a polarization relationship between a source transmission and a target transmission with respect to the apparatus and a user equipment; and means for transmitting, to the user equipment, a quasi co-location instance indicating the polarization relationship between the source transmission and the target transmission.

In some aspects, an apparatus for wireless communication includes means for receiving, from a base station, a polarization indication that indicates a polarization for a bandwidth part; and means for performing a communication with the base station based at least in part on the polarization for the bandwidth part.

In some aspects, an apparatus for wireless communication includes means for receiving, from a base station, a configuration that indicates a polarization of a transmission; and means for processing the transmission based at least in part on the polarization of the transmission.

In some aspects, an apparatus for wireless communication includes means for receiving, from a base station, a quasi co-location instance indicating a polarization relationship between a source transmission and a target transmission with respect to the apparatus and the base station; and means for performing a communication with the base station based at least in part on the polarization relationship.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
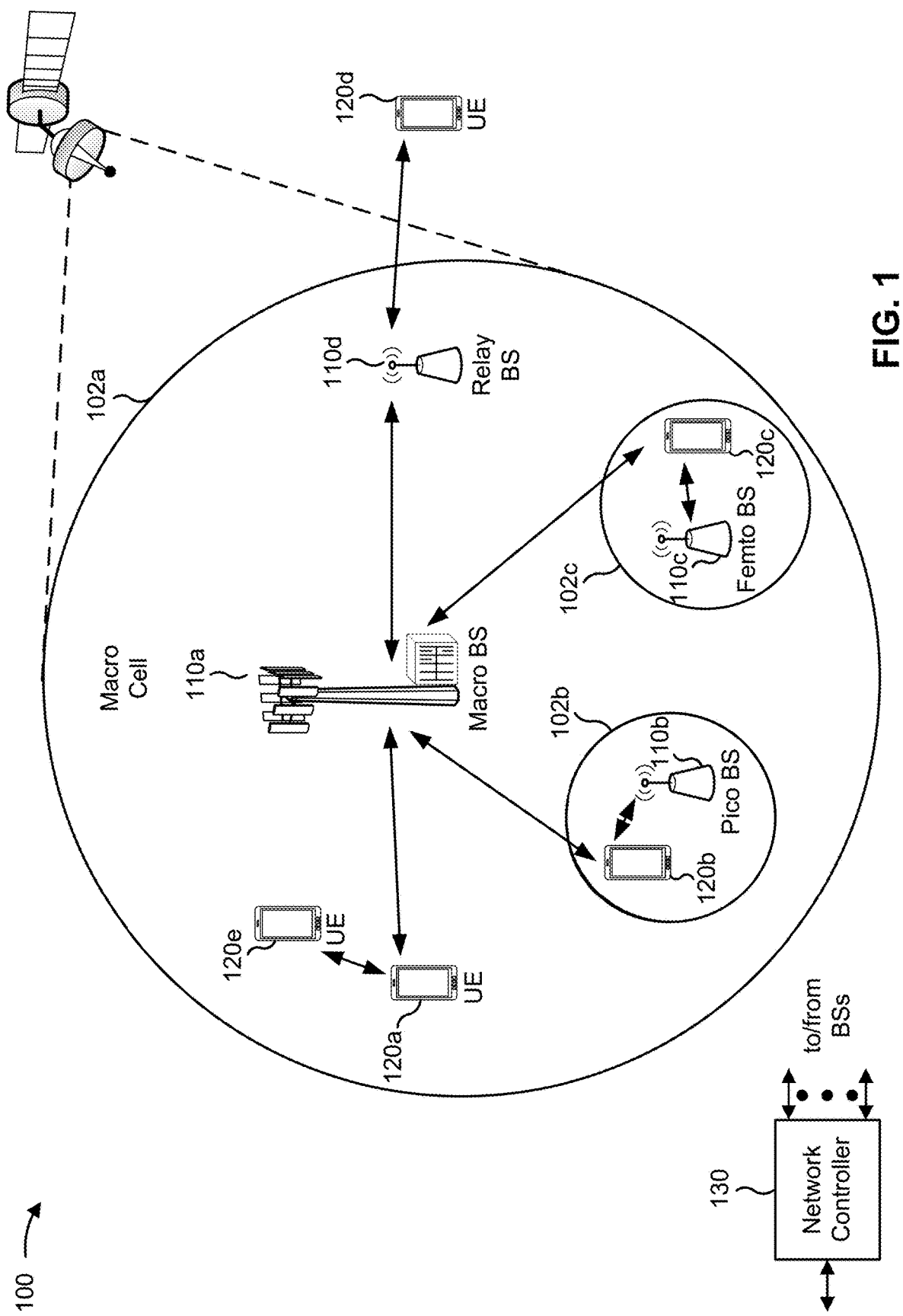
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
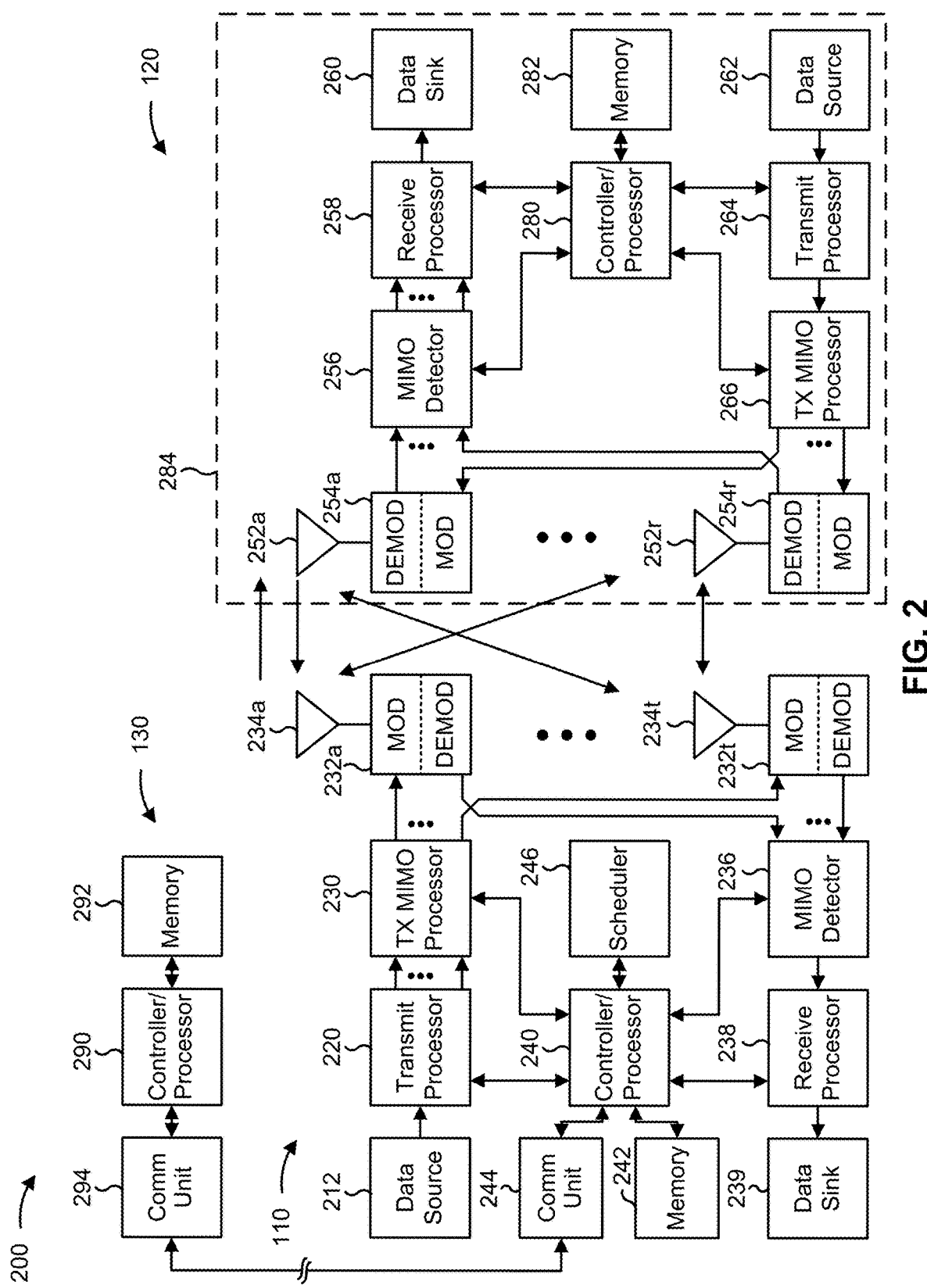
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-14).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-14).

The controller/processor 240 of the base station 110, the controller/processor 280 of the UE 120, and/or any other component(s) of FIG. 2 may perform one or more techniques associated with polarization indication signaling as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, process 1100 of FIG. 11, process 1200 of FIG. 12, process 1300 of FIG. 13, process 1400 of FIG. 14, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, process 1100 of FIG. 11, process 1200 of FIG. 12, process 1300 of FIG. 13, process 1400 of FIG. 14, and/or other processes as described herein. In some examples, executing instructions may include running the instructions, converting the instructions, compiling the instructions, and/or interpreting the instructions, among other examples.

In some aspects, a base station (e.g., base station 110) may include means for determining a polarization of a bandwidth part; and/or means for transmitting, to a user equipment, a polarization indication that indicates the polarization for the bandwidth part. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or antenna 234.

In some aspects, a base station (e.g., base station 110) may include means for determining a polarization of a transmission; and/or means for transmitting, to a user equipment, a configuration that indicates the polarization of the transmission. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or antenna 234.

In some aspects, a base station (e.g., base station 110) may include means for determining a polarization relationship between a source transmission and a target transmission with respect to the base station and a user equipment; and/or means for transmitting, to the user equipment, a quasi co-location instance indicating the polarization relationship between the source transmission and the target transmission. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or antenna 234.

In some aspects, a UE (e.g., UE 120) may include means for receiving, from a base station, a polarization indication that indicates a polarization for a bandwidth part; and/or means for performing a communication with the base station based at least in part on the polarization for the bandwidth part. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

In some aspects, a UE (e.g., UE 120) may include means for receiving, from a base station, a configuration that indicates a polarization of a transmission; and/or means for processing the transmission based at least in part on the polarization of the transmission. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

In some aspects, a UE (e.g., UE 120) may include means for receiving, from a base station, a quasi co-location instance indicating a polarization relationship between a source transmission and a target transmission; and/or means for performing a communication with the base station based at least in part on the polarization relationship. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
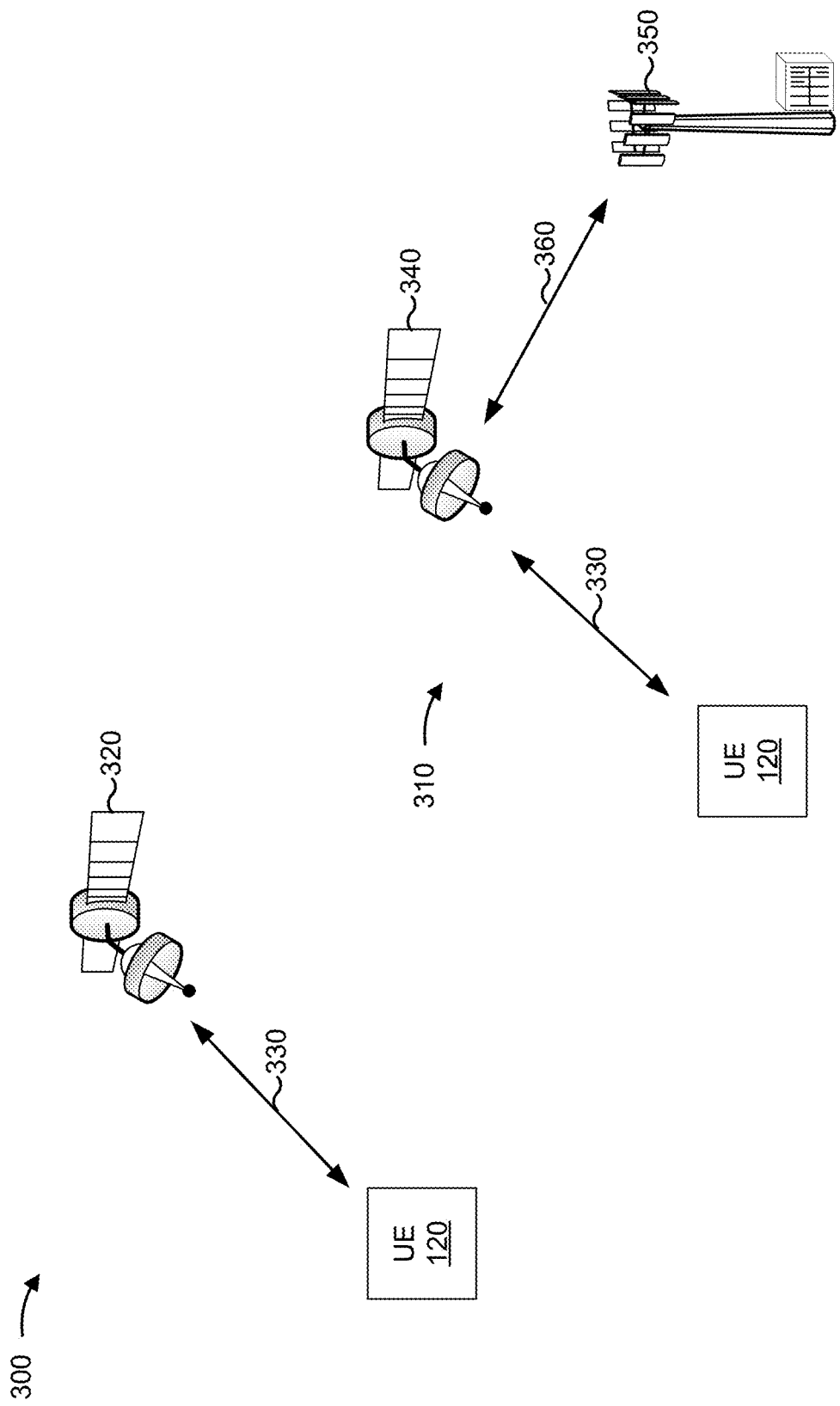
FIG. 3 is a diagram illustrating an example of a regenerative satellite deployment and an example of a transparent satellite deployment in a non-terrestrial network, in accordance with the present disclosure.

FIG. 3 is a diagram illustrating an example 300 of a regenerative satellite deployment and an example 310 of a transparent satellite deployment in a non-terrestrial network, in accordance with the present disclosure.

Example 300 shows a regenerative satellite deployment. In example 300, a UE 120 is served by a satellite 320 via a service link 330. For example, the satellite 320 may include a BS 110 (e.g., BS 110a), and/or a gNB. In some aspects, the satellite 320 may be referred to as a non-terrestrial base station, a regenerative repeater, an on-board processing repeater, and/or a non-terrestrial network entity. In some aspects, the satellite 320 may demodulate an uplink radio frequency signal and may modulate a baseband signal derived from the uplink radio signal to produce a downlink radio frequency transmission. The satellite 320 may transmit the downlink radio frequency signal on the service link 330. The satellite 320 may provide a cell that covers the UE 120.

Example 310 shows a transparent satellite deployment, which may also be referred to as a bent-pipe satellite deployment. In example 310, a UE 120 is served by a satellite 340 via the service link 330. The satellite 340 may be a transparent satellite. The satellite 340 may relay a signal received from gateway 350 via a feeder link 360. For example, the satellite may receive an uplink radio frequency transmission, and may transmit a downlink radio frequency transmission without demodulating the uplink radio frequency transmission. In some aspects, the satellite may frequency convert the uplink radio frequency transmission received on the service link 330 to a frequency of the uplink radio frequency transmission on the feeder link 360, and may amplify and/or filter the uplink radio frequency transmission. In some aspects, the UEs 120 shown in example 300 and example 310 may be associated with a Global Navigation Satellite System (GNSS) capability, and/or a Global Positioning System (GPS) capability, though not all UEs have such capabilities. The satellite 340 may provide a cell that covers the UE 120.

The service link 330 may include a link between the satellite 340 and the UE 120, and may include one or more of an uplink or a downlink. The feeder link 360 may include a link between the satellite 340 and the gateway 350, and may include one or more of an uplink (e.g., from the UE 120 to the gateway 350) or a downlink (e.g., from the gateway 350 to the UE 120).

The feeder link 360 and the service link 330 may each experience Doppler effects due to the movement of the satellites 320 and 340, and potentially movement of a UE 120. These Doppler effects may be significantly larger than in a terrestrial network. The Doppler effect on the feeder link 360 may be compensated for to some degree, but may still be associated with some amount of uncompensated frequency error. Furthermore, the gateway 350 may be associated with a residual frequency error, and/or the satellite 320/340 may be associated with an on-board frequency error. These sources of frequency error may cause a received downlink frequency at the UE 120 to drift from a target downlink frequency.

As indicated above, FIG. 3 is provided as an example. Other examples may differ from what is described with regard to FIG. 3.

Figure 4:
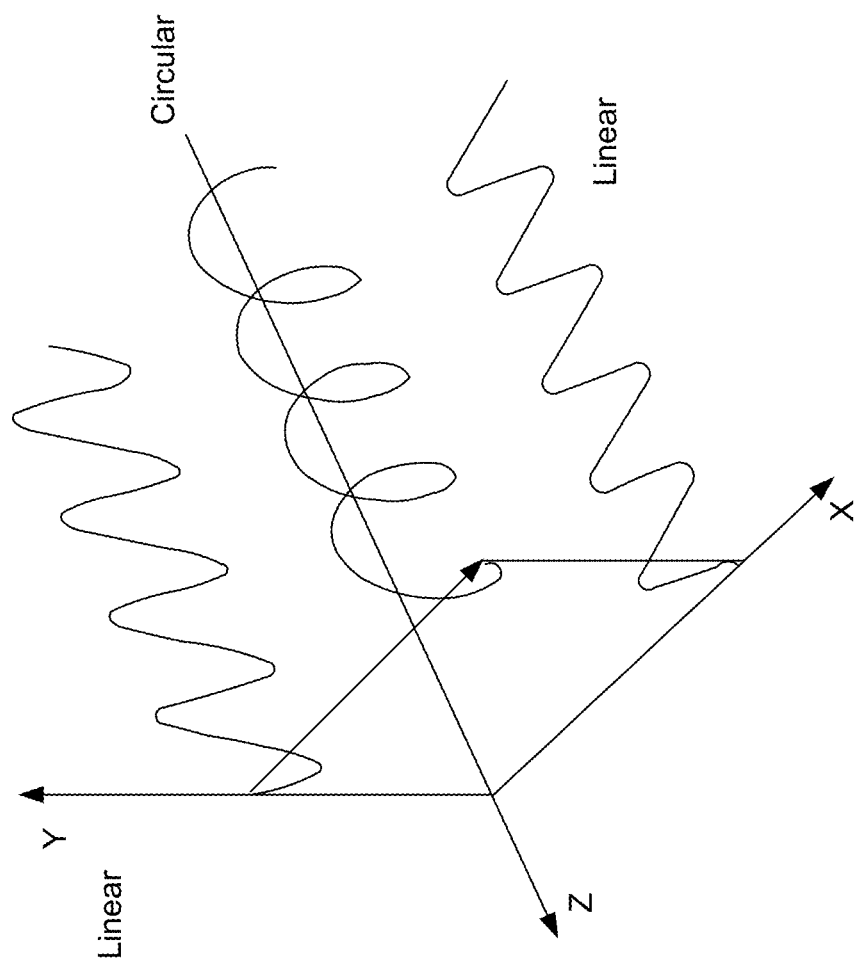
FIG. 4 is a diagram illustrating an example of linear polarization and circular polarization, in accordance with the present disclosure.

FIG. 4 is a diagram illustrating an example 400 of linear polarization and circular polarization, in accordance with the present disclosure.

Linear polarization occurs when the tip of the electric field of an electromagnetic wave at a fixed point in space oscillates along a straight line over time. Circular polarization occurs when the tip of the electric field of an electromagnetic wave at a fixed point in space traces a circle, and the electromagnetic wave may be formed by superposing two orthogonal linearly polarized waves of equal amplitude and a 90-degree phase difference.

As indicated above, FIG. 4 is provided as an example. Other examples may differ from what is described with regard to FIG. 4.

Figure 5:
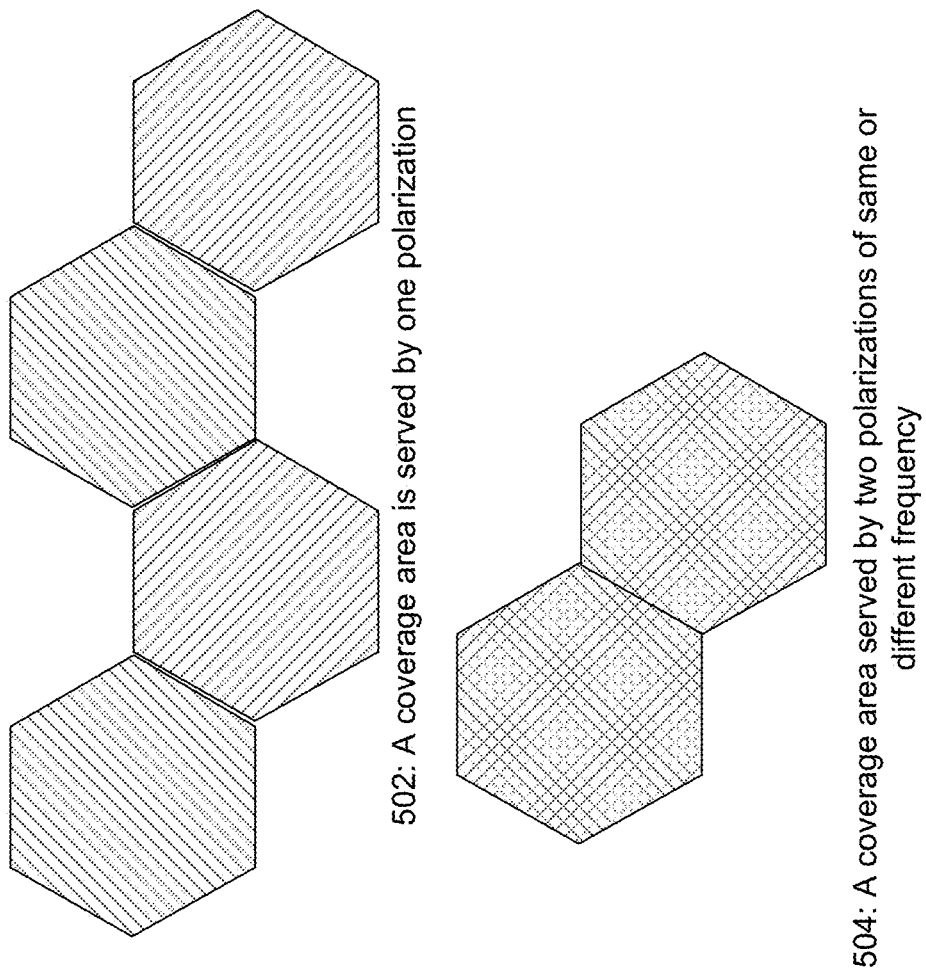
FIG. 5 is a diagram illustrating an example of a coverage area served by one or more polarizations, in accordance with the present disclosure.

FIG. 5 is a diagram illustrating an example 500 of a coverage area served by one or more polarizations, in accordance with the present disclosure.

As shown by reference 502, a coverage area may be served by one polarization to increase a system capacity. One polarization for the coverage area may be beneficial when the coverage area is associated with a sparse constellation of UEs, where the UEs are able to dynamically adjust a polarization. The polarization may be a circular polarization, such as a right hand circular polarization (RHCP) or a left hand circular polarization (LHCP), or the polarization may be a linear polarization, such as a vertical linear polarization or a horizontal linear polarization.

As shown by reference 504, a coverage area may be served by two polarizations to increase a system capacity. The two polarizations may be associated with a same frequency, or the two polarizations may be associated with different frequencies. Two polarizations for the coverage area may be beneficial when the coverage area is associated with a dense constellation of UEs. The two polarizations may be circular polarizations, or the two polarizations may be linear polarizations.

As indicated above, FIG. 5 is provided as an example. Other examples may differ from what is described with regard to FIG. 5.

A transmit polarization may refer to a polarization associated with a transmission from a base station or a UE, and a receive polarization may refer to a polarization associated with a reception at the base station or the UE. In some cases, the transmit polarization may be the same as the receive polarization. However, in other cases, the transmit polarization may be different than the receive polarization, which may result in a polarization mismatch loss. For example, when the transmit polarization is RHCP and the receive polarization is LHCP, the polarization mismatch loss may be greater than 20 dB. When the transmit polarization is a circular polarization and the receive polarization is a linear polarization, or vice versa, the polarization mismatch loss may be about 3 dB. When the transmit polarization is a horizontal linear polarization and the receive polarization is a vertical linear polarization, the polarization mismatch loss may be greater than 20 dB.

Portable devices, such as UEs, may have varying polarization due to movement. Further, linear polarization (e.g., horizontal linear polarization or vertical linear polarization) may not less reliable for portable devices with respect to frequency reuse. Frequency reuse may occur when a specified range of frequencies are used more than once in a same radio system so a total capacity of the radio system is increased without increasing an allocated bandwidth of the radio system.

A UE having a polarization capability may be able to detect a polarization and/or transmit signals with the polarization. For example, a UE capable of two circular polarization modes may be able to detect a circular polarization associated with one of the two circular polarization modes. A UE with two linearly cross-polarized antennas may detect and transmit signals using both circular polarizations.

However, polarization detection may increase processing at the UE. For example, polarization detection for signal transmission and reception with respect to circular and/or linear polarization may increase the processing at the UE. Further, in some cases, the UE may be unable to determine a polarization associated with a signal transmission or reception.

In various aspects of techniques and apparatuses described herein, polarization indication signaling may be configured by a base station to indicate to a UE a polarization. In some aspects, the polarization indication signaling may indicate a polarization associated with a bandwidth part. In some aspects, the polarization indication signaling may indicate a polarization relationship between a source transmission and a target transmission with respect to a base station and a UE. In some aspects, the polarization indication signaling may indicate a polarization associated with a downlink transmission or an uplink transmission. The polarization indication signaling may avoid a polarization mismatch loss at the UE, which may occur when the UE cannot detect the polarization and a mismatch occurs between a transmit polarization and a receive polarization. Even when the UE is capable of detecting the polarization, the polarization indication signaling may reduce an amount of processing that occurs at the UE.

In some aspects, for line of sight signal propagation, the polarization indication signaling may avoid the polarization detection at the UE. In some aspects, for non-line-of-sight and near-line-of-sight signal propagation, the polarization indication signaling may also be useful to the UE. For example, the polarization indication signaling may enable the UE to determine a polarization of a first beam and a polarization of a second beam, and whether the polarization is the same or different with respect to the first beam and the second beam. For a downlink, a receive polarization may be different from a transmit polarization. For an uplink, a transmit polarization may correspond to a receive polarization, assuming downlink and uplink reciprocity (e.g., the uplink and the downlink are relatively close in frequency). For both the downlink and the uplink, the polarization indication signaling may enable the UE to determine the transmit polarization and the receive polarization, where the transmit and receive polarizations may be "best" transmit and receive polarizations as compared to other transmit and receive polarizations that may be used at the UE and/or the base station.

Figure 6:
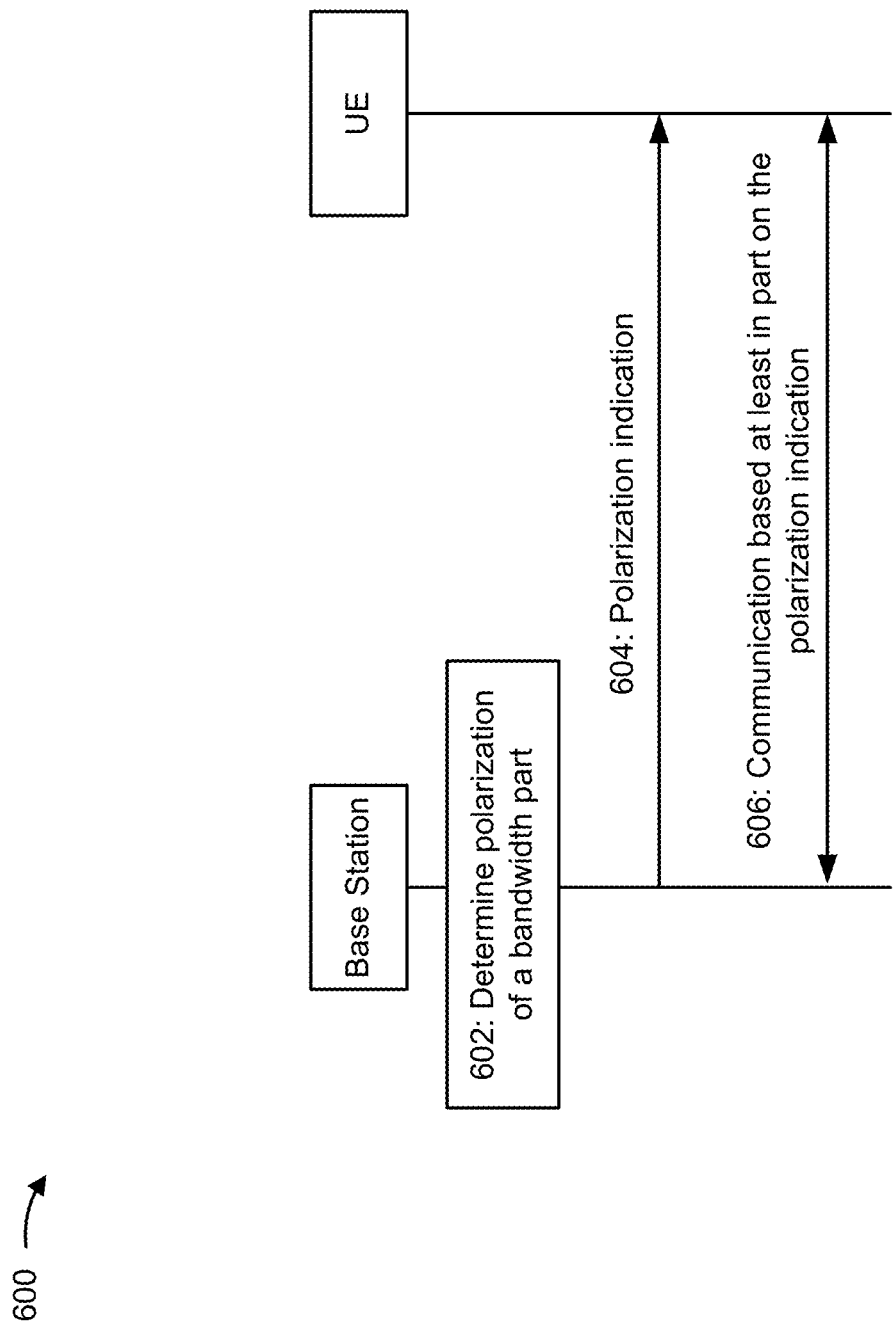
FIGS. 6-8 are diagrams illustrating examples associated with polarization indication signaling, in accordance with the present disclosure.

FIG. 6 is a diagram illustrating an example 600 associated with polarization indication signaling, in accordance with the present disclosure. As shown in FIG. 6, example 600 includes communication between a base station (e.g., base station 110) and a UE (e.g., UE 120). In some aspects, the base station and the UE may be included in a wireless network such as wireless network 100. The base station and the UE may communicate on a wireless sidelink.

As shown by reference number 602, the base station may determine a polarization of a bandwidth part. In some aspects, the polarization may be predefined for a particular bandwidth part. For example, the polarization may be RHCP, LHCP, a vertical linear polarization, and/or a horizontal linear polarization for a particular bandwidth part.

In some aspects, the polarization of the bandwidth part may be based at least in part on a polarization of a reference signal associated with the bandwidth part, such as a synchronization signal block (SSB) or a channel state information reference signal (CSI-RS). For example, the polarization of the bandwidth part may correspond to a polarization of the SSB or the CSI-RS, or the polarization of the bandwidth part may be orthogonal to a polarization of the SSB or the CSI-RS.

In some aspects, a first polarization may be associated with a first bandwidth part, and a second polarization may be associated with a second bandwidth part. Switching between the first bandwidth part and the second bandwidth part may involve switching between the first polarization and the second polarization. In other words, polarization switching may become a part of bandwidth part switching.

In some aspects, a polarization of a bandwidth part may be a default polarization for a plurality of transmissions (e.g., all transmissions) associated with the bandwidth part. In some aspects, the polarization of the bandwidth part may be the default polarization for a physical downlink shared channel (PDSCH) transmission, or a physical downlink control channel (PDCCH) transmission, when the bandwidth part is a downlink bandwidth part. In some aspects, the polarization of the bandwidth part may be the default polarization for a control resource set, when the bandwidth part is the downlink bandwidth part. In some aspects, the polarization of the bandwidth part may be the default polarization for a physical uplink shared channel (PUSCH) transmission, or a physical uplink control channel (PUCCH) transmission, when the bandwidth part is an uplink bandwidth part.

In some aspects, when a downlink transmission (e.g., a PDCCH transmission or a PDSCH transmission) is configured in a bandwidth part, a polarization of the downlink transmission may correspond to a polarization of the bandwidth part. In some aspects, when an uplink transmission (e.g., a PUCCH transmission or a PUSCH transmission) is configured in a bandwidth part, a polarization of the uplink transmission may correspond to a polarization of the bandwidth part.

As shown by reference number 604, the base station may transmit, to the UE, a polarization indication that indicates the polarization for the bandwidth part. In some aspects, the polarization may explicitly indicate the polarization for the bandwidth part (e.g., RHCP, LHCP). In some aspects, the polarization indication may indicate the polarization for the bandwidth part based at least in part on the polarization of the reference signal (e.g., SSB, CSI-RS) associated with the bandwidth part.

As shown by reference number 606, the UE may perform a communication with the base station based at least in part on the polarization for the bandwidth part, as indicated in the polarization indication. For example, the UE may receive the polarization indication that indicates the polarization for the bandwidth part, and the UE may perform a transmission in the bandwidth part based at least in part on the polarization associated with the bandwidth part.

As indicated above, FIG. 6 is provided as an example. Other examples may differ from what is described with regard to FIG. 6.

Figure 7:
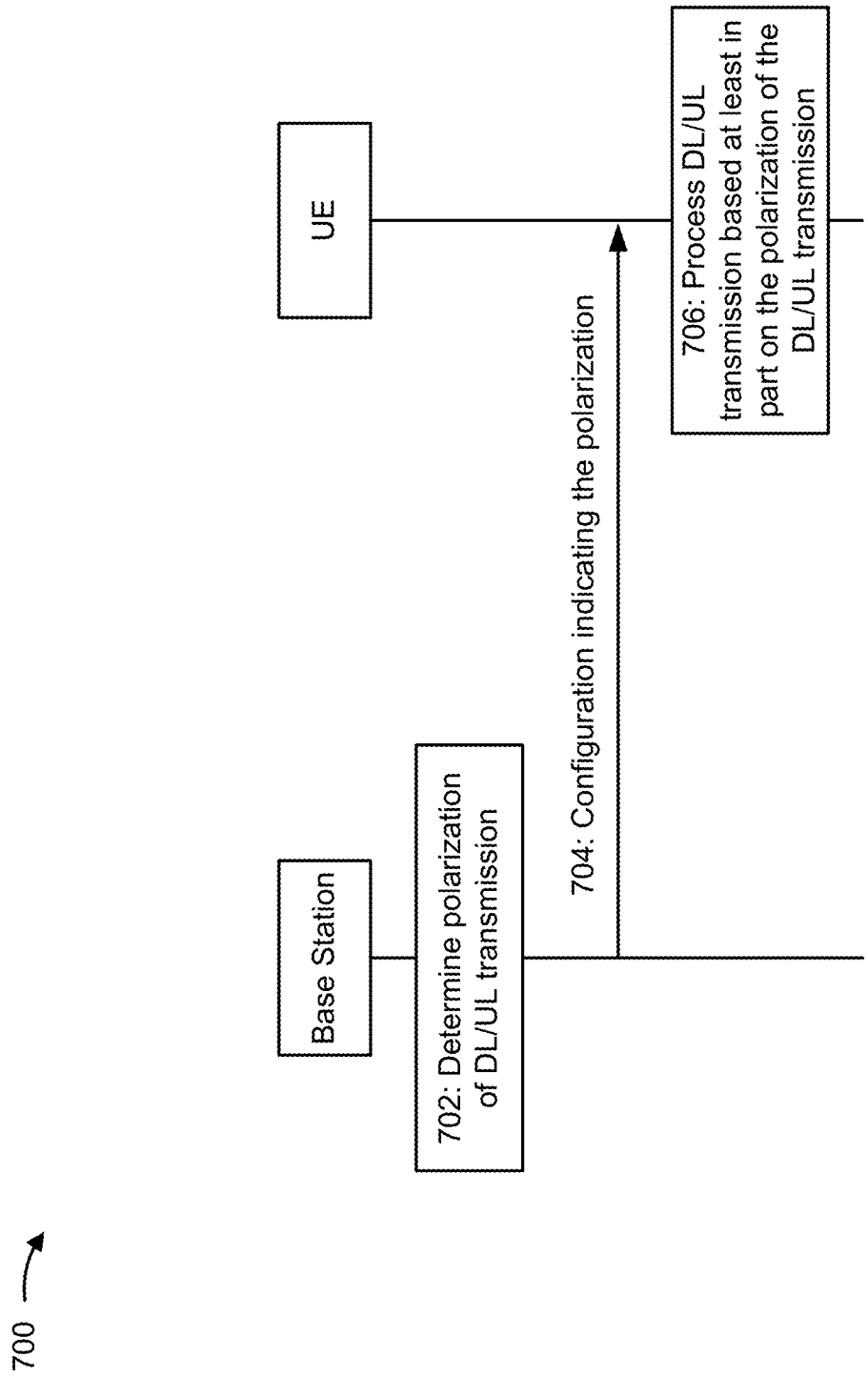

FIG. 7 is a diagram illustrating an example 700 associated with polarization indication signaling, in accordance with the present disclosure. As shown in FIG. 7, example 700 includes communication between a base station (e.g., base station 110) and a UE (e.g., UE 120). In some aspects, the base station and the UE may be included in a wireless network such as wireless network 100. The base station and the UE may communicate on a wireless sidelink.

As shown by reference number 702, the base station may determine a polarization of a transmission, such as a downlink transmission or an uplink transmission. The polarization of the downlink transmission or the uplink transmission may be RHCP, LHCP, a vertical linear polarization, and/or a horizontal linear polarization. The downlink transmission may be a PDCCH transmission, and/or a PDSCH transmission. The uplink transmission may be a PUCCH transmission, and/or a PUSCH transmission. In some aspects, a same polarization may be applicable for multiple types of downlink or uplink transmissions (e.g., a polarization of a PDSCH transmission may correspond to a polarization of a PDCCH transmission).

As shown by reference number 704, the base station may transmit, to the UE, a configuration that indicates the polarization of the transmission (e.g., the downlink transmission or the uplink transmission). The configuration may be a downlink configuration when the transmission corresponds to the downlink transmission, or the configuration may be an uplink configuration when the transmission corresponds to the uplink transmission. In some aspects, the downlink configuration may be associated with a control resource set configuration, and/or a search space configuration.

In some aspects, the downlink configuration may indicate a polarization relationship between the downlink transmission and a reference signal (e.g., an SSB or a CSI-RS), and the UE may derive the polarization of the downlink transmission based at least in part on the polarization relationship indicated in the downlink configuration. The polarization relationship may be a parameter included in a transmission configuration indicator (TCI) state, which may be part of the downlink configuration transmitted from the base station to the UE.

In some aspects, the downlink configuration may explicitly indicate the polarization associated with the downlink transmission. The polarization associated with the downlink transmission may correspond to a polarization associated with the reference signal (e.g., an SSB or a CSI-RS), or the polarization associated with the downlink transmission may be different (e.g., orthogonal) to the polarization associated with the reference signal.

In some aspects, the downlink configuration may be included in downlink control information (DCI), a medium access control-control element (MAC-CE), or a radio resource control (RRC) message. The downlink configuration included in the DCI, the MAC-CE, or the RRC message may include a defined quantity of bits to indicate the polarization of the downlink transmission. For example, when one bit is used to indicate the polarization of the downlink transmission, a first value (e.g., 0) of the bit may indicate a first type of polarization (e.g., LHCP), and a second value (e.g., 1) of the bit may indicate a second type of polarization (e.g., RHCP). In some aspects, an indication of the polarization of the downlink transmission may be considered an allocation of the polarization for the downlink transmission.

In some aspects, the uplink configuration may indicate a polarization relationship between the uplink transmission and a reference signal, such as an SSB, a CSI-RS, or a sounding reference signal (SRS). The UE may derive the polarization of the uplink transmission based at least in part on the polarization relationship indicated in the uplink configuration. The polarization relationship may be a parameter included in a TCI state, which may be part of the uplink configuration transmitted from the base station to the UE. The polarization associated with the uplink transmission may correspond to a polarization associated with the reference signal (e.g., the SSB, the CSI-RS, or the SRS), or the polarization associated with the uplink transmission may be different (e.g., orthogonal) to the polarization associated with the reference signal.

As an example, when the reference signal is an SSB associated with RHCP, the uplink configuration may indicate that the polarization of the uplink transmission is also RHCP. As another example, when the reference signal is a CSI-RS associated with LHCP, the uplink configuration may indicate that the polarization of the uplink transmission is RHCP.

In some aspects, the uplink configuration may indicate a polarization relationship between the uplink transmission and a downlink transmission. The polarization of the uplink transmission may correspond to a polarization of the downlink transmission, or the polarization of the uplink transmission may be different (e.g., orthogonal) to the polarization of the downlink transmission. In some aspects, the downlink transmission may be a PDCCH transmission that configures the polarization relationship with the uplink transmission. In other words, the polarization of the uplink transmission may correspond to the polarization of the PDCCH transmission.

In some aspects, the uplink configuration may explicitly indicate the polarization for the uplink transmission. The uplink configuration may indicate that the polarization for the uplink transmission is RHCP, LHCP, a vertical linear polarization, and/or a horizontal linear polarization. The polarization for the uplink transmission may correspond to a reference polarization (or nominal polarization) associated with a reference signal, or the polarization for the uplink transmission may be different (e.g., orthogonal) to the reference polarization.

In some aspects, the uplink configuration may be included in DCI, a MAC-CE, or an RRC message. The downlink configuration included in the DCI, the MAC-CE, or the RRC message may include a defined quantity of bits to indicate the polarization of the uplink transmission. For example, when one bit is used to indicate the polarization of the uplink transmission, a first value (e.g., 0) of the bit may indicate a first type of polarization (e.g., LHCP), and a second value (e.g., 1) of the bit may indicate a second type of polarization (e.g., RHCP). In some aspects, an indication of the polarization of the uplink transmission may be considered an allocation of the polarization for the uplink transmission.

In some aspects, the uplink configuration may indicate a polarization that corresponds to a polarization of a receive beam used to receive the uplink transmission. In some aspects, the uplink configuration may indicate a polarization that corresponds to an expected polarization of the uplink transmission from the UE.

As shown by reference number 706, the UE may process the transmission (e.g., the downlink transmission of the uplink transmission) based at least in part on the polarization of the transmission. For example, the UE may process the downlink transmission or the uplink transmission based at least in part on the polarization associated with the downlink transmission or the uplink transmission, as indicated by the downlink configuration or the uplink configuration received from the base station.

As indicated above, FIG. 7 is provided as an example. Other examples may differ from what is described with regard to FIG. 7.

Figure 8:
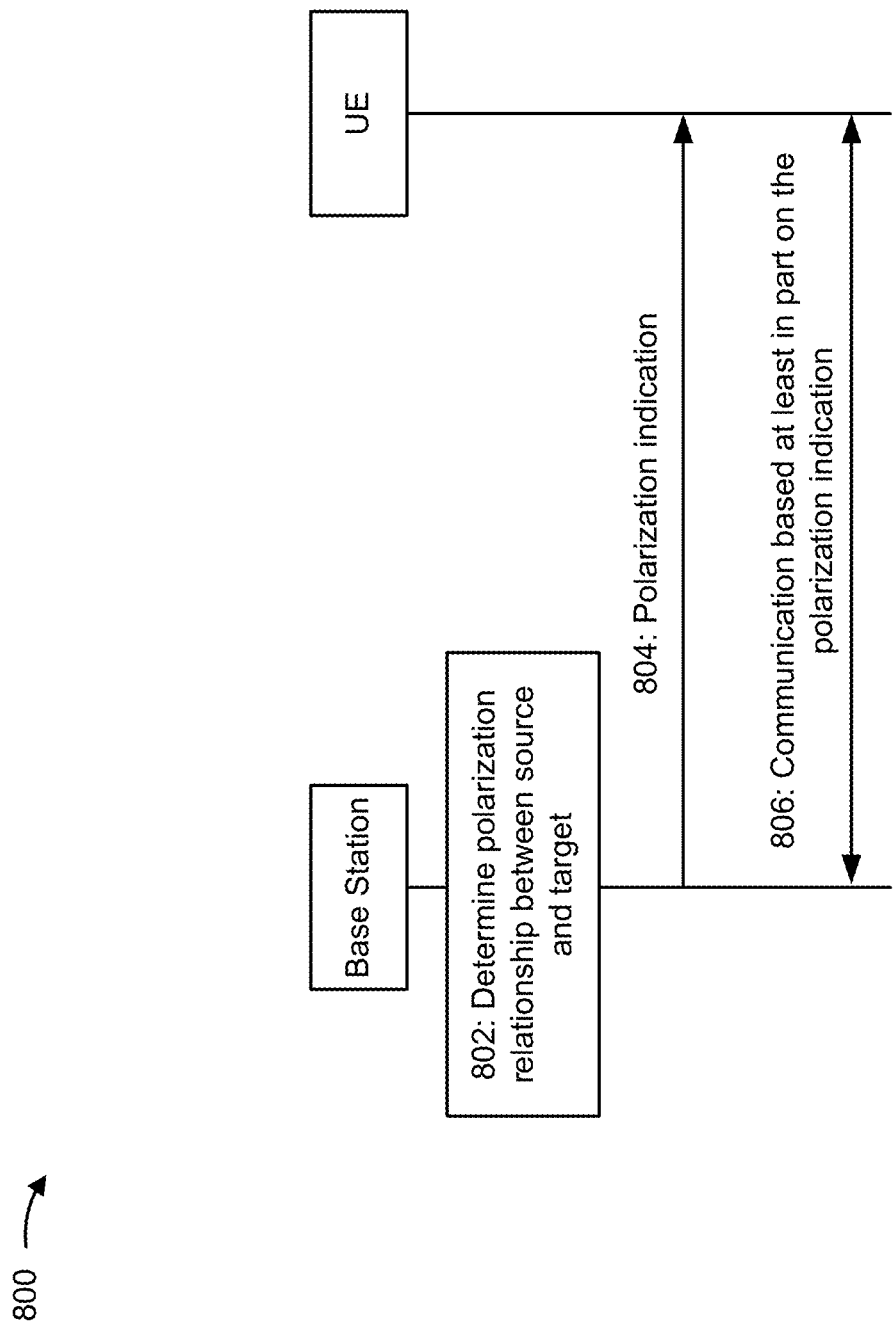

FIG. 8 is a diagram illustrating an example 800 associated with polarization indication signaling, in accordance with the present disclosure. As shown in FIG. 8, example 800 includes communication between a base station (e.g., base station 110) and a UE (e.g., UE 120). In some aspects, the base station and the UE may be included in a wireless network such as wireless network 100.

As shown by reference number 802, the base station may determine a polarization relationship between a source transmission and a target transmission with respect to the base station and the UE. The polarization relationship between the source transmission and the target transmission may be indicated via a quasi co-location (QCL) instance (or a QCL type). The QCL instance may be added as new QCL instances to a TCI state.

In some aspects, the source transmission may be an SSB transmission or a CSI-RS transmission. In some aspects, the target transmission may be an SSB transmission or a CSI-RS transmission. In some aspects, the target transmission may be a transmission associated with a data channel or a control channel (e.g., a PDSCH transmission, a PDCCH transmission, a PUSCH transmission, or a PUCCH transmission).

In some aspects, a TCI state may include QCL types(s) (e.g., QCL Type A through Type D) to indicate a similarity between two antenna ports with respect to a Doppler shift, a Doppler spread, a delay spread, and/or spatial receiver parameters. In some aspects, x new QCL types(s) (e.g., QCL Type E and QCL Type F) may be added to the TCI state to indicate the polarization relationship between the source transmission and the target transmission, where x is a positive integer.

In some aspects, when x is equal to one, a QCL type may indicate a same polarization between the source transmission and the target transmission. In other words, the QCL type may indicate that the source transmission and the target transmission are associated with the same polarization. In some aspects, when x is equal to two, a first QCL type may indicate that the source transmission and the target transmission are associated with the same polarization, and a second QCL type may indicate that the source transmission and the target transmission are associated with a different (e.g., orthogonal) polarization. In other words, the QCL type may indicate that the source transmission and the target transmission are associated with the same polarization or the different polarization. The polarization of the source transmission or the target transmission may be RHCP, LHCP, a vertical linear polarization, and/or a horizontal linear polarization.

As an example, when the polarization of the source transmission is orthogonal to the polarization of the target transmission, the polarization of the source transmission may be LHCP and the polarization of the target transmission may be RHCP. As another example, when the polarization of the source transmission is orthogonal to the polarization of the target transmission, the polarization of the source transmission may be horizontal linear and the polarization of the target transmission may be vertical linear.

In some aspects, a number of QCL instances included in the TCI state may be increased to accommodate the x new QCL types indicating the polarization relationship between the source transmission and the target transmission. For example, the TCI state may include a first QCL instance corresponding to QCL Type A, a second QCL instance corresponding to QCL Type C, and a third QCL instance corresponding to QCL Type E, which may indicate the polarization relationship between the source transmission and the target transmission (e.g., a polarization of the target transmission is the same as a polarization of a reference signal indicated in the third QCL instance).

In some aspects, an existing QCL type included in the TCI state may be reinterpreted to indicate the polarization relationship between the source transmission and the target transmission. For example, existing QCL Type D, which may have previously indicated a spatial receiver parameter, may be reinterpreted to indicate the polarization relationship between the source transmission and the target transmission.

In some aspects, the polarization relationship between the source transmission and the target transmission may be indicated based at least in part on a combination of adding new QCL type(s) and/or QCL instance(s) and/or reinterpreting existing QCL type(s).

As shown by reference number 804, the base station may transmit, to the UE, the QCL instance indicating the polarization relationship between the source transmission and the target transmission. The QCL instance may be one of a plurality of QCL instances included in the TCI state transmitted from the base station to the UE. In some aspects, the QCL instance may indicate that the source transmission and the target transmission are associated with the same polarization. In some aspects, the QCL instance may indicate that the source transmission and the target transmission are associated with different polarizations. In some aspects, the QCL instance may indicate that the polarization of the target transmission corresponds to the polarization of the reference signal indicated in the QCL instance.

As shown by reference number 806, the UE may perform a communication with the base station based at least in part on the polarization relationship. For example, the UE may receive the QCL instance that indicates the polarization between the source transmission and the target transmission, and the UE may perform a transmission with the base station based at least in part on the polarization relationship.

As indicated above, FIG. 8 is provided as an example. Other examples may differ from what is described with regard to FIG. 8.

Figure 9:
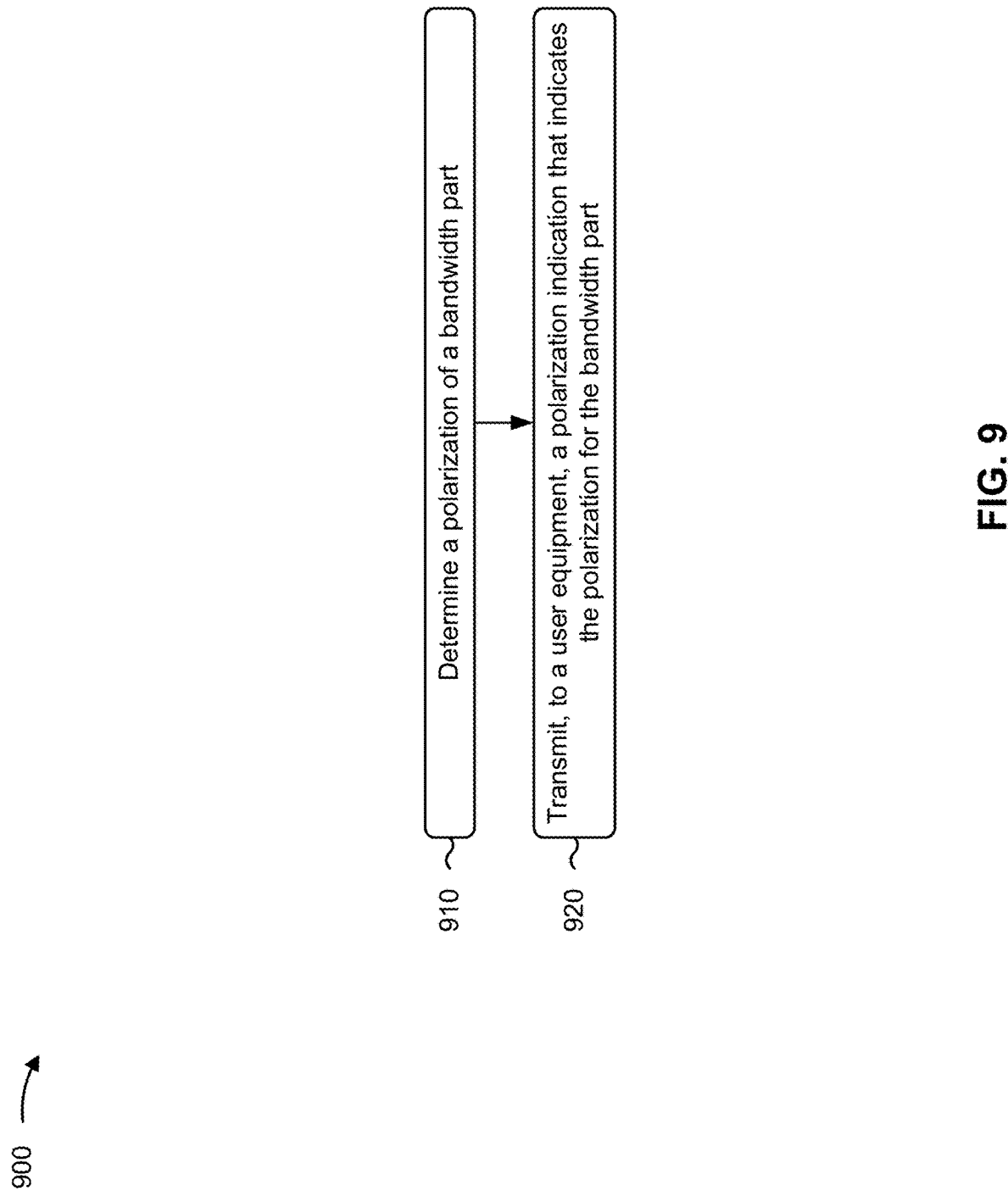
FIGS. 9-14 are diagrams illustrating example processes associated with polarization indication signaling, in accordance with the present disclosure.

FIG. 9 is a diagram illustrating an example process 900 performed, for example, by a base station, in accordance with the present disclosure. Example process 900 is an example where the base station (e.g., base station 110) performs operations associated with polarization indication signaling.

As shown in FIG. 9, in some aspects, process 900 may include determining a polarization of a bandwidth part (block 910). For example, the base station (e.g., using transmit processor 220, TX MIMO processor 230, modulator 232, antenna 234, demodulator 232, MIMO detector 236, receive processor 238, controller/processor 240, memory 242, and/or scheduler 246) may determine a polarization of a bandwidth part, as described above.

As further shown in FIG. 9, in some aspects, process 900 may include transmitting, to a user equipment, a polarization indication that indicates the polarization for the bandwidth part (block 920). For example, the base station (e.g., using transmit processor 220, TX MIMO processor 230, modulator 232, antenna 234, controller/processor 240, memory 242, and/or scheduler 246) may transmit, to a user equipment, a polarization indication that indicates the polarization for the bandwidth part, as described above.

Process 900 may include additional aspects, such as any single aspect or any combination of aspects described below and/or in connection with one or more other processes described elsewhere herein.

In a first aspect, the polarization indication explicitly indicates the polarization for the bandwidth part.

In a second aspect, alone or in combination with the first aspect, the polarization indication indicates the polarization for the bandwidth part based at least in part on a polarization of a reference signal associated with the bandwidth part.

In a third aspect, alone or in combination with one or more of the first and second aspects, the reference signal is a synchronization signal block or a channel state information reference signal.

In a fourth aspect, alone or in combination with one or more of the first through third aspects, the polarization of the bandwidth part is applicable to one or more of a downlink shared channel transmission, a downlink control channel transmission, or a control resource set, when the bandwidth part is a downlink bandwidth part.

In a fifth aspect, alone or in combination with one or more of the first through fourth aspects, the polarization of the bandwidth part is applicable to one or more of an uplink control channel transmission or an uplink shared channel transmission, when the bandwidth part is an uplink bandwidth part.

In a sixth aspect, alone or in combination with one or more of the first through fifth aspects, the polarization of the bandwidth part is one of a right hand circular polarization, a left hand circular polarization, a vertical linear polarization, or a horizontal linear polarization.

In a seventh aspect, alone or in combination with one or more of the first through sixth aspects, a polarization of a downlink transmission corresponds to the polarization of the bandwidth part, wherein the downlink transmission is configured in the bandwidth part.

In an eighth aspect, alone or in combination with one or more of the first through seventh aspects, a polarization of an uplink transmission corresponds to the polarization of the bandwidth part, wherein the uplink transmission is configured in the bandwidth part.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
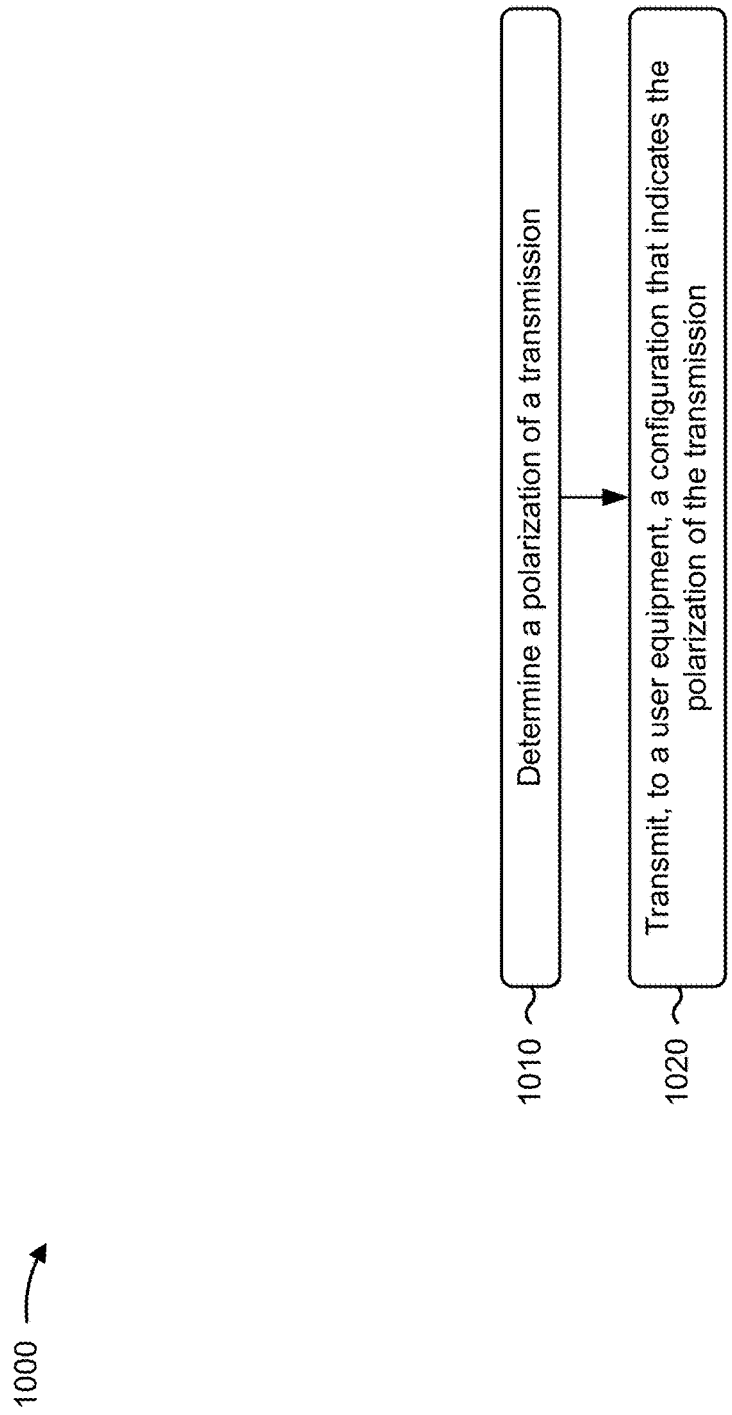

FIG. 10 is a diagram illustrating an example process 1000 performed, for example, by a base station, in accordance with the present disclosure. Example process 1000 is an example where the base station (e.g., base station 110) performs operations associated with polarization indication signaling.

As shown in FIG. 10, in some aspects, process 1000 may include determining a polarization of a transmission (block 1010). For example, the base station (e.g., using transmit processor 220, TX MIMO processor 230, modulator 232, antenna 234, demodulator 232, MIMO detector 236, receive processor 238, controller/processor 240, memory 242, and/or scheduler 246) may determine a polarization of a transmission, as described above.

As further shown in FIG. 10, in some aspects, process 1000 may include transmitting, to a user equipment, a configuration that indicates the polarization of the transmission (block 1020). For example, the base station (e.g., using transmit processor 220, TX MIMO processor 230, modulator 232, antenna 234, controller/processor 240, memory 242, and/or scheduler 246) may transmit, to a user equipment, a configuration that indicates the polarization of the transmission, as described above.

Process 1000 may include additional aspects, such as any single aspect or any combination of aspects described below and/or in connection with one or more other processes described elsewhere herein.

In a first aspect, the transmission is a downlink transmission and the configuration is a downlink configuration.

In a second aspect, alone or in combination with the first aspect, the downlink configuration indicates a polarization relationship between the downlink transmission and a reference signal, wherein the reference signal is a synchronization signal block or a channel state information reference signal.

In a third aspect, alone or in combination with one or more of the first and second aspects, the downlink configuration includes a transmission configuration indicator state to indicate the polarization relationship between the downlink transmission and the reference signal.

In a fourth aspect, alone or in combination with one or more of the first through third aspects, the downlink configuration explicitly indicates the polarization of the downlink transmission, wherein the polarization of the downlink transmission corresponds to a polarization of the reference signal.

In a fifth aspect, alone or in combination with one or more of the first through fourth aspects, the downlink configuration is transmitted via downlink control information, a radio resource control message, or a medium access control-control element.

In a sixth aspect, alone or in combination with one or more of the first through fifth aspects, the downlink configuration includes a defined quantity of bits to indicate the polarization of the downlink transmission.

In a seventh aspect, alone or in combination with one or more of the first through sixth aspects, the downlink transmission includes a downlink control channel transmission or a downlink shared channel transmission, and wherein the downlink configuration includes a control resource set configuration or a search space configuration.

In an eighth aspect, alone or in combination with one or more of the first through seventh aspects, the transmission is an uplink transmission, and the configuration is an uplink configuration.

In a ninth aspect, alone or in combination with one or more of the first through eighth aspects, the uplink configuration indicates a polarization relationship between the uplink transmission and a reference signal, wherein the polarization of the uplink transmission corresponds to a polarization of the reference signal or the polarization of the uplink transmission is orthogonal to the polarization of the reference transmission.

In a tenth aspect, alone or in combination with one or more of the first through ninth aspects, the reference signal is a synchronization signal block, a channel state information reference signal, or a sounding reference signal.

In an eleventh aspect, alone or in combination with one or more of the first through tenth aspects, the uplink configuration indicates a polarization relationship between the uplink transmission and a downlink transmission, wherein the polarization of the uplink transmission corresponds to a polarization of the downlink transmission, or the polarization of the uplink transmission is orthogonal to the polarization of the downlink transmission.

In a twelfth aspect, alone or in combination with one or more of the first through eleventh aspects, the uplink configuration explicitly indicates the polarization of the uplink transmission, wherein the polarization of the uplink transmission corresponds to a polarization of a reference signal.

In a thirteenth aspect, alone or in combination with one or more of the first through twelfth aspects, the uplink configuration is transmitted via downlink control information, a radio resource control message, or a medium access control-control element.

In a fourteenth aspect, alone or in combination with one or more of the first through thirteenth aspects, the uplink configuration includes a defined quantity of bits to indicate the polarization of the uplink transmission.

In a fifteenth aspect, alone or in combination with one or more of the first through fourteenth aspects, the polarization indicates a polarization of a receive beam in the uplink transmission or an expected polarization of the uplink transmission.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
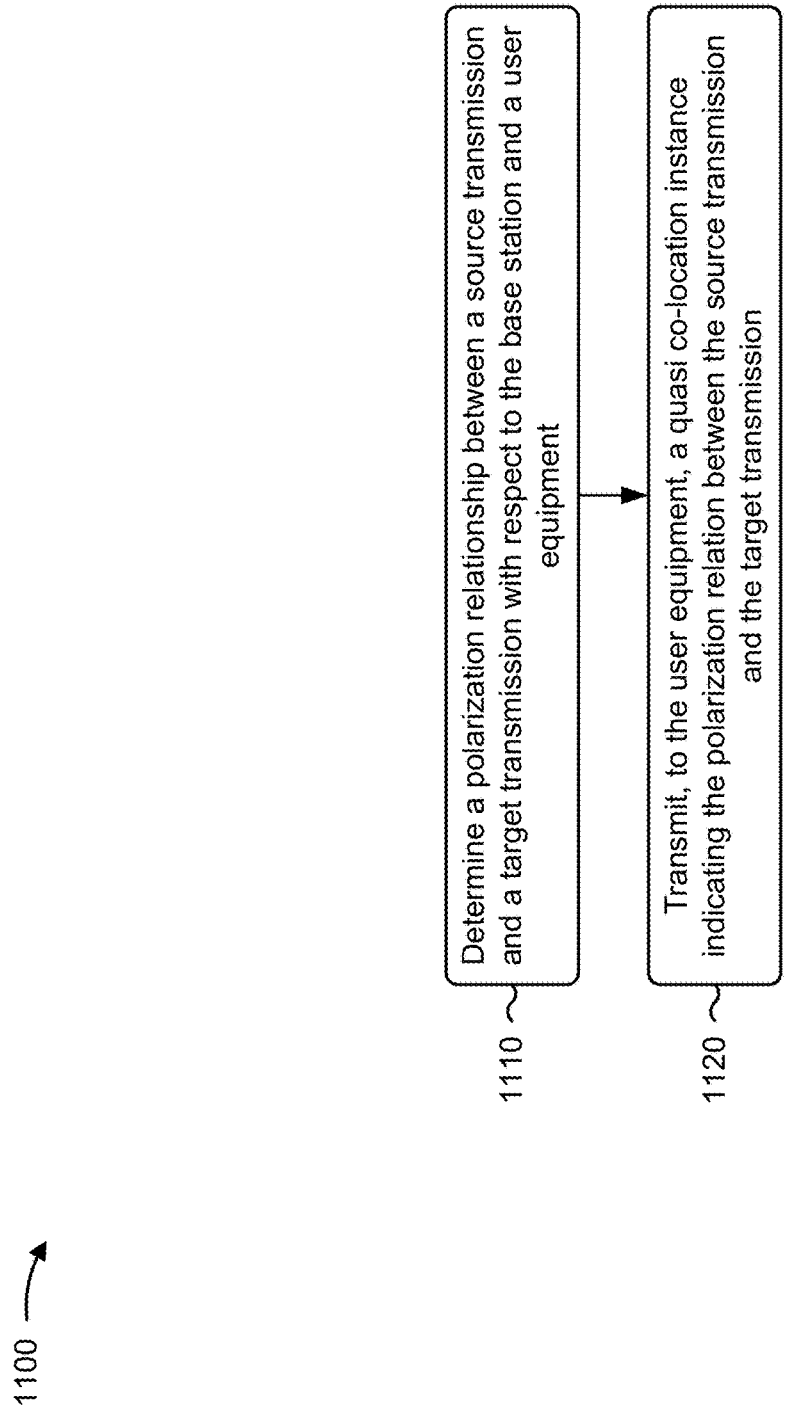

FIG. 11 is a diagram illustrating an example process 1100 performed, for example, by a base station, in accordance with the present disclosure. Example process 1100 is an example where the base station (e.g., base station 110) performs operations associated with polarization indication signaling.

As shown in FIG. 11, in some aspects, process 1100 may include determining a polarization relationship between a source transmission and a target transmission with respect to the base station and a user equipment (block 1110). For example, the base station (e.g., using transmit processor 220, TX MIMO processor 230, modulator 232, antenna 234, demodulator 232, MIMO detector 236, receive processor 238, controller/processor 240, memory 242, and/or scheduler 246) may determine a polarization relationship between a source transmission and a target transmission with respect to the base station and a user equipment, as described above.

As further shown in FIG. 11, in some aspects, process 1100 may include transmitting, to the user equipment, a quasi co-location instance indicating the polarization relationship between the source transmission and the target transmission (block 1120). For example, the base station (e.g., using transmit processor 220, TX MIMO processor 230, modulator 232, antenna 234, controller/processor 240, memory 242, and/or scheduler 246) may transmit, to the user equipment, a quasi co-location instance indicating the polarization relationship between the source transmission and the target transmission, as described above.

Process 1100 may include additional aspects, such as any single aspect or any combination of aspects described below and/or in connection with one or more other processes described elsewhere herein.

In a first aspect, the quasi co-location instance indicates that the source transmission and the target transmission are associated with a same polarization.

In a second aspect, alone or in combination with the first aspect, the quasi co-location instance indicates that the source transmission and the target transmission are associated with a different polarization.

In a third aspect, alone or in combination with one or more of the first and second aspects, the source transmission is one of a synchronization signal block or a channel state information reference signal.

In a fourth aspect, alone or in combination with one or more of the first through third aspects, the target transmission is one of a synchronization signal block, a channel state information reference signal, a data channel transmission, or a control channel transmission.

In a fifth aspect, alone or in combination with one or more of the first through fourth aspects, the polarization of the source transmission or the target transmission is one of a right hand circular polarization, a left hand circular polarization, a vertical linear polarization, or a horizontal linear polarization.

In a sixth aspect, alone or in combination with one or more of the first through fifth aspects, the quasi co-location instance is one of a plurality of quasi co-location instances included in a transmission configuration indicator state.

In a seventh aspect, alone or in combination with one or more of the first through sixth aspects, the quasi co-location instance indicates that a polarization of the target transmission corresponds to a polarization of a reference signal indicated in the quasi co-location instance.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
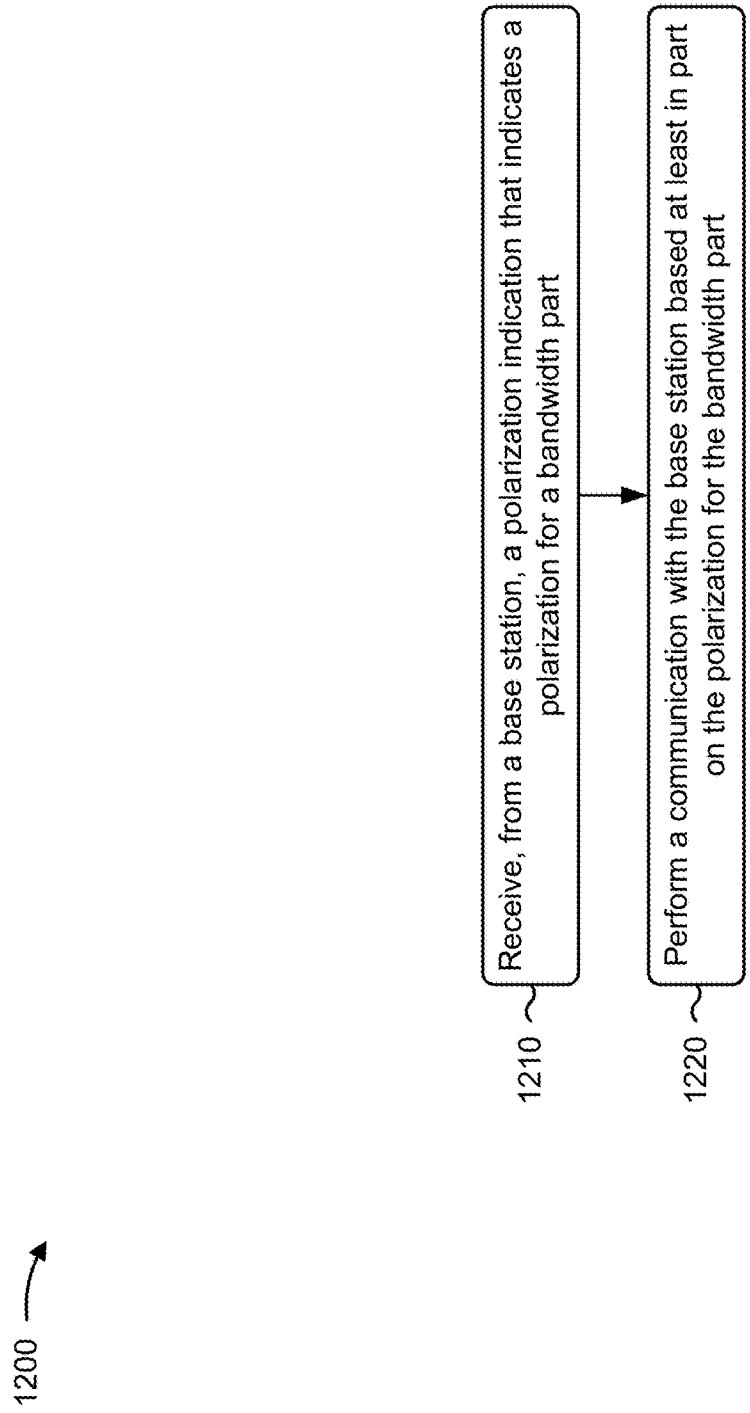

FIG. 12 is a diagram illustrating an example process 1200 performed, for example, by a user equipment, in accordance with the present disclosure. Example process 1200 is an example where the user equipment (e.g., user equipment 120) performs operations associated with polarization indication signaling.

As shown in FIG. 12, in some aspects, process 1200 may include receiving, from a base station, a polarization indication that indicates a polarization for a bandwidth part (block 1210). For example, the user equipment (e.g., using antenna 252, demodulator 254, MIMO detector 256, receive processor 258, controller/processor 280, and/or memory 282) may receive, from a base station, a polarization indication that indicates a polarization for a bandwidth part, as described above.

As further shown in FIG. 12, in some aspects, process 1200 may include performing a communication with the base station based at least in part on the polarization for the bandwidth part (block 1220). For example, the user equipment (e.g., using antenna 252, demodulator 254, MIMO detector 256, receive processor 258, transmit processor 264, TX MIMO processor 266, modulator 254, controller/processor 280, and/or memory 282) may perform a communication with the base station based at least in part on the polarization for the bandwidth part, as described above.

Process 1200 may include additional aspects, such as any single aspect or any combination of aspects described below and/or in connection with one or more other processes described elsewhere herein.

In a first aspect, the polarization indication explicitly indicates the polarization for the bandwidth part.

In a second aspect, alone or in combination with the first aspect, the polarization indication indicates the polarization for the bandwidth part based at least in part on a polarization of a reference signal associated with the bandwidth part.

In a third aspect, alone or in combination with one or more of the first and second aspects, the reference signal is a synchronization signal block or a channel state information reference signal.

In a fourth aspect, alone or in combination with one or more of the first through third aspects, the polarization of the bandwidth part is applicable to one or more of a downlink shared channel transmission, a downlink control channel transmission, or a control resource set when the bandwidth part is a downlink bandwidth part.

In a fifth aspect, alone or in combination with one or more of the first through fourth aspects, the polarization of the bandwidth part is applicable to one or more of an uplink control channel transmission, or an uplink shared channel transmission, when the bandwidth part is an uplink bandwidth part.

In a sixth aspect, alone or in combination with one or more of the first through fifth aspects, the polarization of the bandwidth part is one of a right hand circular polarization, a left hand circular polarization, a vertical linear polarization, or a horizontal linear polarization.

In a seventh aspect, alone or in combination with one or more of the first through sixth aspects, a polarization of a downlink transmission corresponds to the polarization of the bandwidth part, wherein the downlink transmission is configured in the bandwidth part.

In an eighth aspect, alone or in combination with one or more of the first through seventh aspects, a polarization of an uplink transmission corresponds to the polarization of the bandwidth part, wherein the uplink transmission is configured in the bandwidth part.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
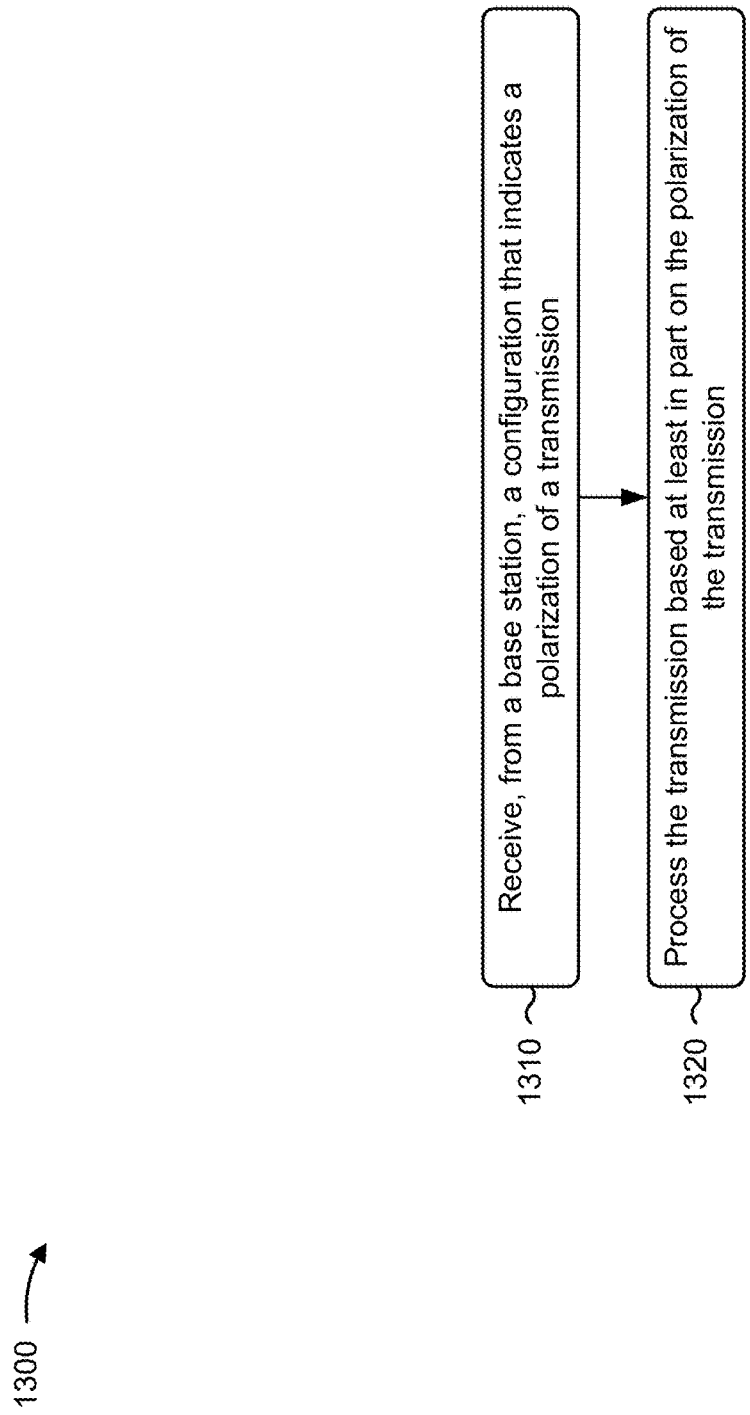

FIG. 13 is a diagram illustrating an example process 1300 performed, for example, by a user equipment, in accordance with the present disclosure. Example process 1300 is an example where the user equipment (e.g., user equipment 120) performs operations associated with polarization indication signaling.

As shown in FIG. 13, in some aspects, process 1300 may include receiving, from a base station, a configuration that indicates a polarization of a transmission (block 1310). For example, the user equipment (e.g., using antenna 252, demodulator 254, MIMO detector 256, receive processor 258, controller/processor 280, and/or memory 282) may receive, from a base station, a configuration that indicates a polarization of a transmission, as described above.

As further shown in FIG. 13, in some aspects, process 1300 may include processing the transmission based at least in part on the polarization of the transmission (block 1320). For example, the user equipment (e.g., using antenna 252, demodulator 254, MIMO detector 256, receive processor 258, transmit processor 264, TX MIMO processor 266, modulator 254, controller/processor 280, and/or memory 282) may process the transmission based at least in part on the polarization of the transmission, as described above.

Process 1300 may include additional aspects, such as any single aspect or any combination of aspects described below and/or in connection with one or more other processes described elsewhere herein.

In a first aspect, the transmission is a downlink transmission and the configuration is a downlink configuration.

In a second aspect, alone or in combination with the first aspect, the downlink configuration indicates a polarization relationship between the downlink transmission and a reference signal, wherein the reference signal is a synchronization signal block or a channel state information reference signal.

In a third aspect, alone or in combination with one or more of the first and second aspects, the downlink configuration includes a transmission configuration indicator state to indicate the polarization relationship between the downlink transmission and the reference signal.

In a fourth aspect, alone or in combination with one or more of the first through third aspects, the downlink configuration explicitly indicates the polarization of the downlink transmission, wherein the polarization of the downlink transmission corresponds to a polarization of the reference signal.

In a fifth aspect, alone or in combination with one or more of the first through fourth aspects, the downlink configuration is transmitted via downlink control information, a radio resource control message, or a medium access control-control element.

In a sixth aspect, alone or in combination with one or more of the first through fifth aspects, the downlink configuration includes a defined quantity of bits to indicate the polarization of the downlink transmission.

In a seventh aspect, alone or in combination with one or more of the first through sixth aspects, the downlink transmission includes a downlink control channel transmission or a downlink shared channel transmission, and wherein the downlink configuration includes a control resource set configuration or a search space configuration.

In an eighth aspect, alone or in combination with one or more of the first through seventh aspects, the transmission is an uplink transmission and the configuration is an uplink configuration.

In a ninth aspect, alone or in combination with one or more of the first through eighth aspects, the uplink configuration indicates a polarization relationship between the uplink transmission and a reference signal, wherein the polarization of the uplink transmission corresponds to a polarization of the reference signal or the polarization of the uplink transmission is orthogonal to the polarization of the reference transmission.

In a tenth aspect, alone or in combination with one or more of the first through ninth aspects, the reference signal is a synchronization signal block, a channel state information reference signal, or a sounding reference signal.

In an eleventh aspect, alone or in combination with one or more of the first through tenth aspects, the uplink configuration indicates a polarization relationship between the uplink transmission and a downlink transmission, wherein the polarization of the uplink transmission corresponds to a polarization of the downlink transmission, or the polarization of the uplink transmission is orthogonal to the polarization of the downlink transmission.

In a twelfth aspect, alone or in combination with one or more of the first through eleventh aspects, the uplink configuration explicitly indicates the polarization of the uplink transmission, wherein the polarization of the uplink transmission corresponds to a polarization of a reference signal.

In a thirteenth aspect, alone or in combination with one or more of the first through twelfth aspects, the uplink configuration is transmitted via downlink control information, a radio resource control message, or a medium access control-control element.

In a fourteenth aspect, alone or in combination with one or more of the first through thirteenth aspects, the uplink configuration includes a defined quantity of bits to indicate the polarization of the uplink transmission.

In a fifteenth aspect, alone or in combination with one or more of the first through fourteenth aspects, the polarization indicates a polarization of a receive beam in the uplink transmission or an expected polarization of the uplink transmission.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
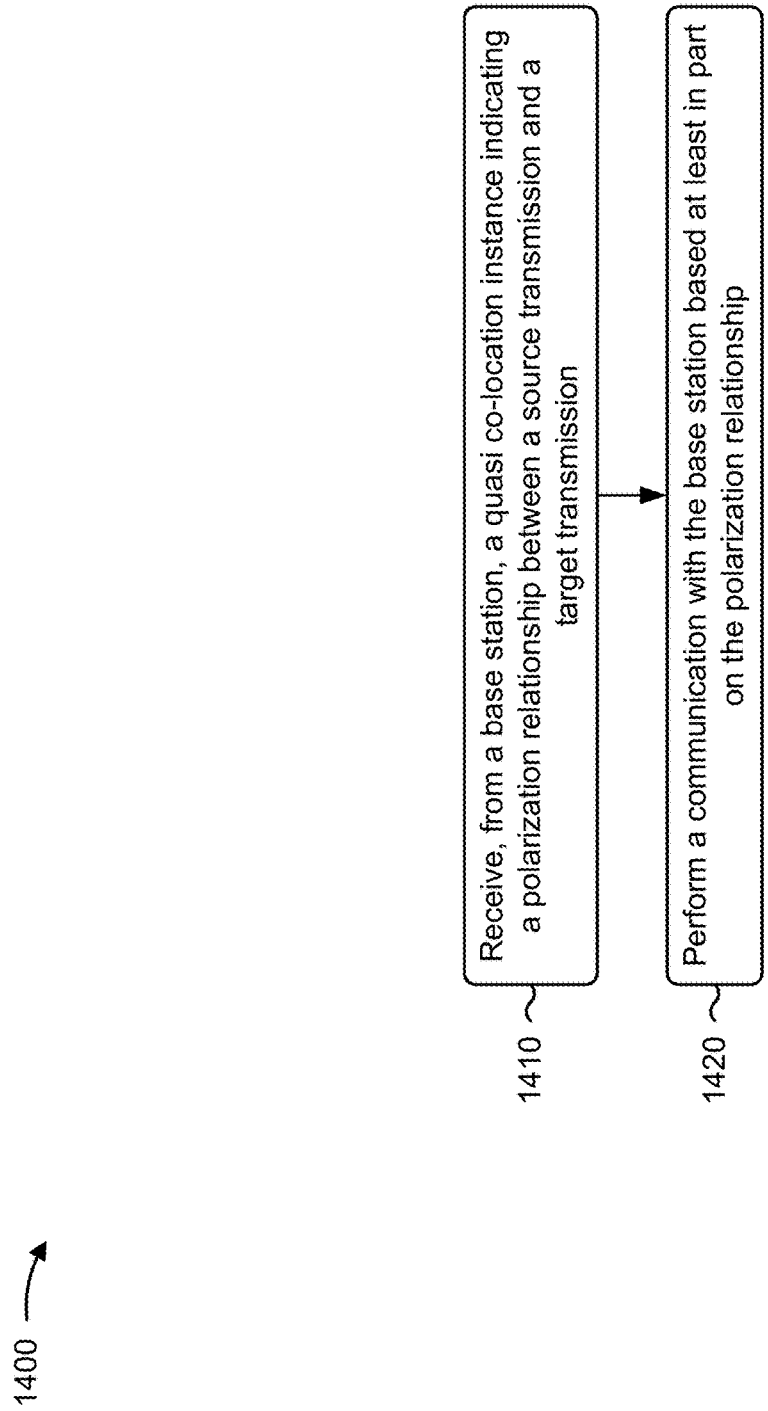

FIG. 14 is a diagram illustrating an example process 1400 performed, for example, by a user equipment, in accordance with the present disclosure. Example process 1400 is an example where the user equipment (e.g., user equipment 120) performs operations associated with polarization indication signaling.

As shown in FIG. 14, in some aspects, process 1400 may include receiving, from a base station, a quasi co-location instance indicating a polarization relationship between a source transmission and a target transmission (block 1410). For example, the user equipment (e.g., using antenna 252, demodulator 254, MIMO detector 256, receive processor 258, controller/processor 280, and/or memory 282) may receive, from a base station, a quasi co-location instance indicating a polarization relationship between a source transmission and a target transmission, as described above.

As further shown in FIG. 14, in some aspects, process 1400 may include performing a communication with the base station based at least in part on the polarization relationship (block 1420). For example, the user equipment (e.g., using antenna 252, demodulator 254, MIMO detector 256, receive processor 258, transmit processor 264, TX MIMO processor 266, modulator 254, controller/processor 280, and/or memory 282) may perform a communication with the base station based at least in part on the polarization relationship, as described above.

Process 1400 may include additional aspects, such as any single aspect or any combination of aspects described below and/or in connection with one or more other processes described elsewhere herein.

In a first aspect, the quasi co-location instance indicates that the source transmission and the target transmission are associated with a same polarization.

In a second aspect, alone or in combination with the first aspect, the quasi co-location instance indicates that the source transmission and the target transmission are associated with a different polarization.

In a third aspect, alone or in combination with one or more of the first and second aspects, the source transmission is one of a synchronization signal block or a channel state information reference signal.

In a fourth aspect, alone or in combination with one or more of the first through third aspects, the target transmission is one of a synchronization signal block, a channel state information reference signal, a data channel transmission, or a control channel transmission.

In a fifth aspect, alone or in combination with one or more of the first through fourth aspects, the polarization of the source transmission or the target transmission is one of a right hand circular polarization, a left hand circular polarization, a vertical linear polarization, or a horizontal linear polarization.

In a sixth aspect, alone or in combination with one or more of the first through fifth aspects, the quasi co-location instance is one of a plurality of quasi co-location instances included in a transmission configuration indicator state.

In a seventh aspect, alone or in combination with one or more of the first through sixth aspects, the quasi co-location instance indicates that a polarization of the target transmission corresponds to a polarization of a reference signal indicated in the quasi co-location instance.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
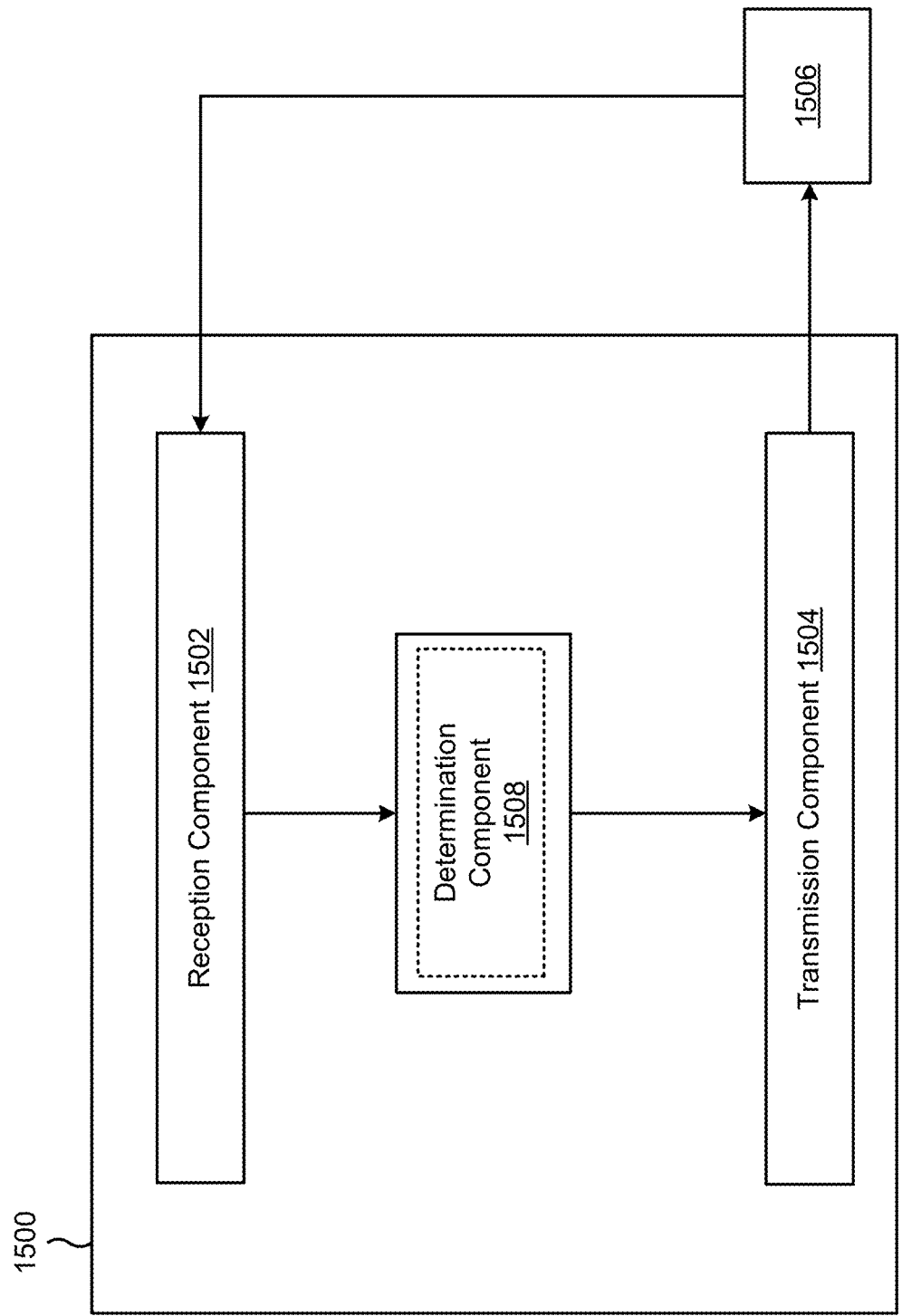
FIGS. 15-16 are block diagrams of example apparatuses for wireless communication, in accordance with the present disclosure.

FIG. 15 is a block diagram of an example apparatus 1500 for wireless communication. The apparatus 1500 may be a base station, or a base station may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include a determination component 1508, among other examples.

In some aspects, the apparatus 1500 may be configured to perform one or more operations described herein in connection with FIGS. 6-8. Additionally, or alternatively, the apparatus 1500 may be configured to perform one or more processes described herein, such as process 900 of FIG. 9, process 1000 of FIG. 10, process 1100 of FIG. 11, or a combination thereof. In some aspects, the apparatus 1500 and/or one or more components shown in FIG. 15 may include one or more components of the base station described above in connection with FIG. 2. Additionally, or alternatively, one or more components shown in FIG. 15 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the base station described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the base station described above in connection with FIG. 2. In some aspects, the transmission component 1504 may be collocated with the reception component 1502 in a transceiver.

The determination component 1508 may determine a polarization of a bandwidth part. In some aspects, the determination component 1508 may include one or more antennas, a demodulator, a MIMO detector, a receive processor, a modulator, a transmit MIMO processor, a transmit processor, a controller/processor, a memory, or a combination thereof, of the base station described above in connection with FIG. 2. The transmission component 1504 may transmit, to a user equipment, a polarization indication that indicates the polarization for the bandwidth part.

The determination component 1508 may determine a polarization of a transmission. The transmission component 1504 may transmit, to a user equipment, a configuration that indicates the polarization of the transmission.

The determination component 1508 may determine a polarization relationship between a source transmission and a target transmission with respect to the base station and a user equipment. The transmission component 1504 may transmit, to the user equipment, a quasi co-location instance indicating the polarization relationship between the source transmission and the target transmission.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
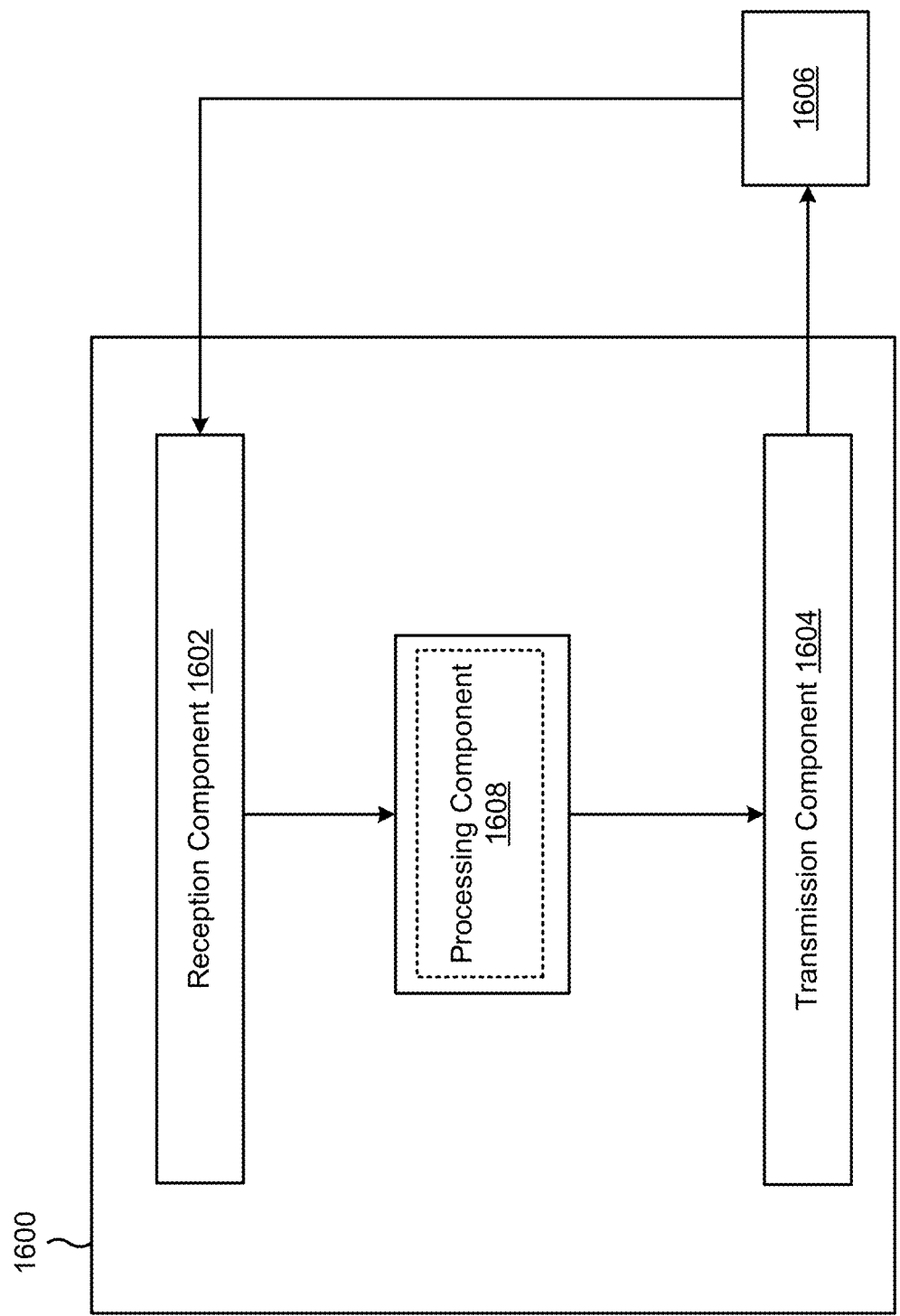

FIG. 16 is a block diagram of an example apparatus 1600 for wireless communication. The apparatus 1600 may be a user equipment, or a user equipment may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include a processing component 1608, among other examples.

In some aspects, the apparatus 1600 may be configured to perform one or more operations described herein in connection with FIGS. 6-8. Additionally, or alternatively, the apparatus 1600 may be configured to perform one or more processes described herein, such as process 1200 of FIG. 12, process 1300 of FIG. 13, process 1400 of FIG. 14, or a combination thereof. In some aspects, the apparatus 1600 and/or one or more components shown in FIG. 16 may include one or more components of the user equipment described above in connection with FIG. 2. Additionally, or alternatively, one or more components shown in FIG. 16 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a demodulator, a MIMO detector, a receive processor, a controller/processor, a memory, or a combination thereof, of the user equipment described above in connection with FIG. 2.

The transmission component 1604 may transmit communications, such as reference signals, control information, data communications, or a combination thereof, to the apparatus 1606. In some aspects, one or more components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the user equipment described above in connection with FIG. 2. In some aspects, the transmission component 1604 may be collocated with the reception component 1602 in a transceiver.

The reception component 1602 may receive, from a base station, a polarization indication that indicates a polarization for a bandwidth part. The transmission component 1604 may perform a communication with the base station based at least in part on the polarization for the bandwidth part.

The reception component 1602 may receive, from a base station, a configuration that indicates a polarization of a transmission. The processing component 1608 may process the transmission based at least in part on the polarization of the transmission. In some aspects, the processing component 1608 may include one or more antennas, a demodulator, a MIMO detector, a receive processor, a modulator, a transmit MIMO processor, a transmit processor, a controller/processor, a memory, or a combination thereof, of the user equipment described above in connection with FIG. 2.

The reception component 1602 may receive, from a base station, a quasi co-location instance indicating a polarization relationship between a source transmission and a target transmission. The transmission component 1604 may perform a communication with the base station based at least in part on the polarization relationship.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a user equipment, comprising: receiving, from a base station, a polarization indication that indicates a polarization for a bandwidth part; and performing a communication with the base station based at least in part on the polarization for the bandwidth part.

Aspect 2: The method of Aspect 1, wherein the polarization indication explicitly indicates the polarization for the bandwidth part.

Aspect 3: The method of any of Aspects 1 through 2, wherein the polarization indication indicates the polarization for the bandwidth part based at least in part on a polarization of a reference signal associated with the bandwidth part.

Aspect 4: The method of Aspect 3, wherein the reference signal is a synchronization signal block or a channel state information reference signal.

Aspect 5: The method of any of Aspects 1 through 4, wherein the polarization of the bandwidth part is applicable to one or more of a downlink shared channel transmission, a downlink control channel transmission, or a control resource set when the bandwidth part is a downlink bandwidth part.

Aspect 6: The method of any of Aspects 1 through 5, wherein the polarization of the bandwidth part is applicable to one or more of an uplink control channel transmission, or an uplink shared channel transmission, when the bandwidth part is an uplink bandwidth part.

Aspect 7: The method of any of Aspects 1 through 6, wherein the polarization of the bandwidth part is one of: a right hand circular polarization, a left hand circular polarization, a vertical linear polarization, or a horizontal linear polarization.

Aspect 8: The method of any of Aspects 1 through 7, wherein a polarization of a downlink transmission corresponds to the polarization of the bandwidth part, wherein the downlink transmission is configured in the bandwidth part.

Aspect 9: The method of any of Aspects 1 through 8, wherein a polarization of an uplink transmission corresponds to the polarization of the bandwidth part, wherein the uplink transmission is configured in the bandwidth part.

Aspect 10: A method of wireless communication performed by a user equipment, comprising: receiving, from a base station, a configuration that indicates a polarization of a transmission; and processing the transmission based at least in part on the polarization of the transmission.

Aspect 11: The method of Aspect 10, wherein the transmission is a downlink transmission and the configuration is a downlink configuration.

Aspect 12: The method of Aspect 11, wherein the downlink configuration indicates a polarization relationship between the downlink transmission and a reference signal, wherein the reference signal is a synchronization signal block or a channel state information reference signal.

Aspect 13: The method of Aspect 12, wherein the downlink configuration includes a transmission configuration indicator state to indicate the polarization relationship between the downlink transmission and the reference signal.

Aspect 14: The method of Aspect 12, wherein the downlink configuration explicitly indicates the polarization of the downlink transmission, wherein the polarization of the downlink transmission corresponds to a polarization of the reference signal.

Aspect 15: The method of Aspect 11, wherein the downlink configuration is transmitted via downlink control information, a radio resource control message, or a medium access control-control element.

Aspect 16: The method of Aspect 11, wherein the downlink configuration includes a defined quantity of bits to indicate the polarization of the downlink transmission.

Aspect 17: The method of Aspect 11, wherein the downlink transmission includes a downlink control channel transmission or a downlink shared channel transmission, and wherein the downlink configuration includes a control resource set configuration or a search space configuration.

Aspect 18: The method of any of Aspects 10 through 17, wherein the transmission is an uplink transmission and the configuration is an uplink configuration.

Aspect 19: The method of Aspect 18, wherein the uplink configuration indicates a polarization relationship between the uplink transmission and a reference signal, wherein the polarization of the uplink transmission corresponds to a polarization of the reference signal or the polarization of the uplink transmission is orthogonal to the polarization of the reference transmission.

Aspect 20: The method of Aspect 19, wherein the reference signal is a synchronization signal block, a channel state information reference signal, or a sounding reference signal.

Aspect 21: The method of Aspect 18, wherein the uplink configuration indicates a polarization relationship between the uplink transmission and a downlink transmission, wherein the polarization of the uplink transmission corresponds to a polarization of the downlink transmission, or the polarization of the uplink transmission is orthogonal to the polarization of the downlink transmission.

Aspect 22: The method of Aspect 18, wherein the uplink configuration explicitly indicates the polarization of the uplink transmission, wherein the polarization of the uplink transmission corresponds to a polarization of a reference signal.

Aspect 23: The method of Aspect 18, wherein the uplink configuration is transmitted via downlink control information, a radio resource control message, or a medium access control-control element, and wherein the uplink configuration includes a defined quantity of bits to indicate the polarization of the uplink transmission.

Aspect 24: The method of Aspect 18, wherein the polarization indicates a polarization of a receive beam in the uplink transmission or an expected polarization of the uplink transmission.

Aspect 25: A method of wireless communication performed by a user equipment, comprising: receiving, from a base station, a quasi co-location instance indicating a polarization relationship between a source transmission and a target transmission; and performing a communication with the base station based at least in part on the polarization relationship.

Aspect 26: The method of Aspect 25, wherein the quasi co-location instance indicates that the source transmission and the target transmission are associated with a same polarization.

Aspect 27: The method of any of Aspects 25 through 26, wherein the quasi co-location instance indicates that the source transmission and the target transmission are associated with a different polarization.

Aspect 28: The method of any of Aspects 25 through 27, wherein: the source transmission is one of: a synchronization signal block or a channel state information reference signal; and the target transmission is one of: a synchronization signal block, a channel state information reference signal, a data channel transmission, or a control channel transmission.

Aspect 29: The method of any of Aspects 25 through 28, wherein the polarization of the source transmission or the target transmission is one of: a right hand circular polarization, a left hand circular polarization, a vertical linear polarization, or a horizontal linear polarization.

Aspect 30: The method of any of Aspects 25 through 29, wherein the quasi co-location instance is one of a plurality of quasi co-location instances included in a transmission configuration indicator state, and wherein the quasi co-location instance indicates that a polarization of the target transmission corresponds to a polarization of a reference signal indicated in the quasi co-location instance.

Aspect 31: An apparatus for wireless communication at a device, comprising a processor; memory coupled with the processor; and instructions stored in the memory and executable by the processor to cause the apparatus to perform the method of one or more of Aspects 1-9.

Aspect 32: A device for wireless communication, comprising a memory and one or more processors coupled to the memory, the one or more processors configured to perform the method of one or more of Aspects 1-9.

Aspect 33: An apparatus for wireless communication, comprising at least one means for performing the method of one or more of Aspects 1-9.

Aspect 34: A non-transitory computer-readable medium storing code for wireless communication, the code comprising instructions executable by a processor to perform the method of one or more of Aspects 1-9.

Aspect 35: A non-transitory computer-readable medium storing a set of instructions for wireless communication, the set of instructions comprising one or more instructions that, when executed by one or more processors of a device, cause the device to perform the method of one or more of Aspects 1-9.

Aspect 36: An apparatus for wireless communication at a device, comprising a processor; memory coupled with the processor; and instructions stored in the memory and executable by the processor to cause the apparatus to perform the method of one or more of Aspects 10-24.

Aspect 37: A device for wireless communication, comprising a memory and one or more processors coupled to the memory, the one or more processors configured to perform the method of one or more of Aspects 10-24.

Aspect 38: An apparatus for wireless communication, comprising at least one means for performing the method of one or more of Aspects 10-24.

Aspect 39: A non-transitory computer-readable medium storing code for wireless communication, the code comprising instructions executable by a processor to perform the method of one or more of Aspects 10-24.

Aspect 40: A non-transitory computer-readable medium storing a set of instructions for wireless communication, the set of instructions comprising one or more instructions that, when executed by one or more processors of a device, cause the device to perform the method of one or more of Aspects 10-24.

Aspect 41: An apparatus for wireless communication at a device, comprising a processor; memory coupled with the processor; and instructions stored in the memory and executable by the processor to cause the apparatus to perform the method of one or more of Aspects 25-30.

Aspect 42: A device for wireless communication, comprising a memory and one or more processors coupled to the memory, the one or more processors configured to perform the method of one or more of Aspects 25-30.

Aspect 43: An apparatus for wireless communication, comprising at least one means for performing the method of one or more of Aspects 25-30.

Aspect 44: A non-transitory computer-readable medium storing code for wireless communication, the code comprising instructions executable by a processor to perform the method of one or more of Aspects 25-30.

Aspect 45: A non-transitory computer-readable medium storing a set of instructions for wireless communication, the set of instructions comprising one or more instructions that, when executed by one or more processors of a device, cause the device to perform the method of one or more of Aspects 25-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment, comprising:
receiving, from a network entity, an uplink configuration that indicates a polarization of an uplink transmission, the uplink configuration received via downlink control information, a radio resource control message, or a medium access control-control element; and
processing the uplink transmission based at least in part on the polarization.

2. The method of claim 1, wherein the uplink configuration indicates a polarization relationship between the uplink transmission and a reference signal.

3. The method of claim 2, wherein the reference signal is a synchronization signal block, a channel state information reference signal, or a sounding reference signal.

4. The method of claim 2, wherein the polarization of the uplink transmission corresponds to a polarization of the reference signal.

5. The method of claim 2, wherein the polarization of the uplink transmission is orthogonal to the polarization of the reference signal.

6. The method of claim 1, wherein the uplink configuration indicates a polarization relationship between the uplink transmission and a downlink transmission.

7. The method of claim 6, wherein the polarization of the uplink transmission corresponds to a polarization of the downlink transmission.

8. The method of claim 6, wherein the polarization of the uplink transmission is orthogonal to the polarization of the downlink transmission.

9. The method of claim 1, wherein the uplink configuration explicitly indicates the polarization of the uplink transmission, and wherein the polarization of the uplink transmission corresponds to a polarization of a reference signal.

10. The method of claim 1, wherein the uplink configuration includes a defined quantity of bits to indicate the polarization of the uplink transmission.

11. The method of claim 1, wherein the polarization indicates a polarization of a receive beam in the uplink transmission or an expected polarization of the uplink transmission.

12. A method of wireless communication performed by a user equipment, comprising:
receiving, from a network entity, a quasi co-location instance, indicating a polarization relationship between a source transmission and a target transmission, the quasi co-location instance, at least one of:
indicating that the source transmission and the target transmission are associated with a different polarization,
indicating that a polarization of the target transmission corresponds to a polarization of a reference signal indicated in the quasi co-location instance, or
being one of a plurality of quasi co-location instances included in a transmission configuration indicator state; and
performing a communication with the network entity based at least in part on the polarization relationship.

13. The method of claim 12, wherein the quasi co-location instance at least one of: indicates that the polarization of the target transmission corresponds to the polarization of the reference signal indicated in the quasi co-location instance, or is one of the plurality of quasi co-location instances included in the transmission configuration indicator state, and
wherein the quasi co-location instance indicates that the source transmission and the target transmission are associated with a same polarization.

14. The method of claim 13, wherein the polarization of the target transmission is one of: a right hand circular polarization, a left hand circular polarization, a vertical linear polarization, or a horizontal linear polarization.

15. The method of claim 12, wherein:
the source transmission is one of: a synchronization signal block or a channel state information reference signal; and
the target transmission is one of: a synchronization signal block, a channel state information reference signal, a data channel transmission, or a control channel transmission.

16. The method of claim 12, wherein the polarization of the source transmission or the target transmission is one of: a right hand circular polarization, a left hand circular polarization, a vertical linear polarization, or a horizontal linear polarization.

17. A user equipment for wireless communication, comprising:
a memory; and
one or more processors coupled to the memory, the one or more processors configured to:
receive, from a network entity, an uplink configuration that indicates a polarization of an uplink transmission, the uplink configuration received via downlink control information, a radio resource control message, or a medium access control-control element; and
process the uplink transmission based at least in part on the polarization.

18. The user equipment of claim 17, wherein the uplink configuration indicates a polarization relationship between the uplink transmission and a downlink transmission.

19. The user equipment of claim 18, wherein the polarization of the uplink transmission corresponds to a polarization of the downlink transmission.

20. The user equipment of claim 18, wherein the polarization of the uplink transmission is orthogonal to the polarization of the downlink transmission.

21. The user equipment of claim 17, wherein the uplink configuration explicitly indicates the polarization of the uplink transmission, and wherein the polarization of the uplink transmission corresponds to a polarization of a reference signal.

22. The user equipment of claim 17, wherein the uplink configuration includes a defined quantity of bits to indicate the polarization of the uplink transmission.

23. The user equipment of claim 17, wherein the polarization indicates a polarization of a receive beam in the uplink transmission or an expected polarization of the uplink transmission.

24. The user equipment of claim 17, wherein a bit value of the uplink configuration indicates one of a plurality of types of polarization of the uplink transmission.

25. A user equipment for wireless communication, comprising:
a memory; and
one or more processors coupled to the memory, the one or more processors configured to:
receive, from a network entity, a quasi co-location instance, indicating a polarization relationship between a source transmission and a target transmission, the quasi co-location instance configured to, at least one of:
- indicate that the source transmission and the target transmission are associated with a different polarization,
- indicate that a polarization of the target transmission corresponds to a polarization of a reference signal indicated in the quasi co-location instance, or
- be one of a plurality of quasi co-location instances included in a transmission configuration indicator state; and perform a communication with the network entity based at least in part on the polarization relationship.

26. The user equipment of claim 25, wherein the quasi co-location instance is one of the plurality of quasi co-location instances included in the transmission configuration indicator state, and wherein the plurality of quasi co-location instances include a first quasi-colocation instance that indicates that the source transmission and the target transmission are associated with a same polarization.

27. The user equipment of claim 25, wherein the polarization of the source transmission or the target transmission is one of: a right hand circular polarization, a left hand circular polarization, a vertical linear polarization, or a horizontal linear polarization.

28. The user equipment of claim 25, wherein the quasi co-location instance is configured to at least one of: indicate that the polarization of the target transmission corresponds to the polarization of the reference signal indicated in the quasi co-location instance, or be one of the plurality of quasi co-location instances included in the transmission configuration indicator state, and
wherein the quasi co-location instance indicates that the source transmission and the target transmission are associated with a same polarization.

29. The user equipment of claim 28, wherein the polarization of the target transmission is one of: a right hand circular polarization, a left hand circular polarization, a vertical linear polarization, or a horizontal linear polarization.

30. The user equipment of claim 25, wherein:
the source transmission is one of: a synchronization signal block or a channel state information reference signal; and
the target transmission is one of: a synchronization signal block, a channel state information reference signal, a data channel transmission, or a control channel transmission.

* * * * *